‌

US009832655B2

(12) United States Patent
Horneman et al.

(10) Patent No.: US 9,832,655 B2
(45) Date of Patent: Nov. 28, 2017

(54) COMMUNICATION MECHANISM USING CO-PRIMARY SPECTRUM SHARING

(71) Applicant: NOKIA SOLUTIONS AND NETWORKS OY, Espoo (FI)

(72) Inventors: Kari Horneman, Oulu (FI); Ling Yu, Oulu (FI)

(73) Assignee: Nokia Solutions and Networks OY, Espoo (FI)

( * ) Notice: Subject to any disclaimer, the term of this patent is extended or adjusted under 35 U.S.C. 154(b) by 0 days.

(21) Appl. No.: 14/890,108

(22) PCT Filed: May 10, 2013

(86) PCT No.: PCT/EP2013/059711
§ 371 (c)(1),
(2) Date: Nov. 9, 2015

(87) PCT Pub. No.: WO2014/180507
PCT Pub. Date: Nov. 13, 2014

(65) Prior Publication Data
US 2016/0112879 A1    Apr. 21, 2016

(51) Int. Cl.
*H04W 72/00* (2009.01)
*H04W 16/14* (2009.01)
(Continued)

(52) U.S. Cl.
CPC ........... *H04W 16/14* (2013.01); *H04L 5/0096* (2013.01); *H04W 8/02* (2013.01); *H04W 24/02* (2013.01);
(Continued)

(58) Field of Classification Search
CPC ....... H04W 16/14; H04W 8/02; H04W 24/02; H04W 28/085; H04W 36/06; H04W 72/04; H04L 5/0096
(Continued)

(56) References Cited

U.S. PATENT DOCUMENTS

| 5,412,658 A  * | 5/1995 | Arnold | H04W 16/14 |
| | | | 370/330 |
| 7,876,701 B2 * | 1/2011 | Li | H04L 5/0007 |
| | | | 370/241 |

(Continued)

FOREIGN PATENT DOCUMENTS

WO    2010/133239 A1    11/2010
WO    2011020514 A1    2/2011
(Continued)

OTHER PUBLICATIONS

International Search Report and Written Opinion for International Application No. PCT/EP2013/059711, dated Aug. 2014, 16 pages.
(Continued)

*Primary Examiner* — Marceau Milord
(74) *Attorney, Agent, or Firm* — Brake Hughes Bellermann LLP

(57) ABSTRACT

An apparatus including:
at least one processor, and
at least one memory for storing instructions to be executed by the processor, wherein
the at least one memory and the instructions are configured to, with the at least one processor, cause the apparatus to at least:
conduct a processing related to set up a spectrum cooperation relationship in which a spectrum used for communication by a second communication network is allowed to be shared by at least one access network element of a first communication network,
receive and process control information indicating an establishment of a spectrum cooperation relationship between the first communication network and the second communication network, and
establish, on the basis of the control information, a communication connection path to the second commu-
(Continued)

nication network wherein the at least one access network element of the first communication network acts as a communication element of the second communication network.

27 Claims, 16 Drawing Sheets

(51) Int. Cl.
*H04L 5/00* (2006.01)
*H04W 8/02* (2009.01)
*H04W 24/02* (2009.01)
*H04W 72/04* (2009.01)
*H04W 28/08* (2009.01)
*H04W 36/06* (2009.01)
*H04W 92/20* (2009.01)
*H04W 88/18* (2009.01)

(52) U.S. Cl.
CPC ......... *H04W 28/085* (2013.01); *H04W 36/06* (2013.01); *H04W 72/04* (2013.01); *H04W 88/182* (2013.01); *H04W 92/20* (2013.01)

(58) Field of Classification Search
USPC .............................. 455/454, 450, 452.1, 509
See application file for complete search history.

(56) References Cited

U.S. PATENT DOCUMENTS

| | | | | |
|---|---|---|---|---|
| 8,005,091 B2* | 8/2011 | Wu | ...................... | H04L 5/0048 370/207 |
| 8,014,464 B2* | 9/2011 | Benjebbour | ...... | H04L 25/03834 370/206 |
| 8,134,931 B2* | 3/2012 | Laroia | .................... | H04W 8/26 370/252 |
| 8,170,576 B2* | 5/2012 | Wu | ........................ | H04L 5/023 455/454 |
| 8,270,923 B2* | 9/2012 | Li | .......................... | H04B 7/086 455/276.1 |
| 8,290,503 B2* | 10/2012 | Sadek | ................. | H04W 72/082 455/450 |
| 8,295,153 B2* | 10/2012 | Nentwig | ............... | H04L 5/0007 370/204 |
| 8,340,044 B2* | 12/2012 | Laroia | ................. | H04W 72/02 370/319 |
| 8,570,972 B2* | 10/2013 | Laroia | ................. | H04W 76/021 370/231 |
| 8,620,383 B2* | 12/2013 | Panchal | ................ | H04L 5/0096 370/329 |
| 8,654,719 B2* | 2/2014 | Hamalainen | ....... | H04B 7/18563 370/328 |
| 8,675,605 B2* | 3/2014 | Charbit | ............. | H04W 72/1205 370/252 |
| 9,107,232 B2* | 8/2015 | Krishnaswamy | . | H04W 72/1215 |
| 9,144,077 B2* | 9/2015 | Mueck | ................ | H04W 72/082 |
| 9,185,566 B2* | 11/2015 | Prakash | ................ | H04W 16/14 |
| 9,451,612 B2* | 9/2016 | Salem | ................ | H04W 72/0446 |
| 9,473,287 B2* | 10/2016 | Panchal | ................ | H04L 5/0096 |
| 2006/0154668 A1 | 7/2006 | Li et al. | | |
| 2006/0205367 A1* | 9/2006 | Karabinis | .......... | H04B 7/18513 455/95 |
| 2010/0202305 A1 | 8/2010 | Wijting et al. | | |
| 2012/0120887 A1 | 5/2012 | Deaton et al. | | |
| 2013/0090124 A1 | 4/2013 | Panchal et al. | | |
| 2013/0095826 A1 | 4/2013 | Vrbaski et al. | | |
| 2014/0056254 A1* | 2/2014 | Panchal | ................ | H04W 24/02 370/329 |
| 2015/0296485 A1 | 10/2015 | Cordeiro et al. | | |
| 2016/0088487 A1 | 3/2016 | Yu et al. | | |
| 2016/0094999 A1 | 3/2016 | Yu et al. | | |

FOREIGN PATENT DOCUMENTS

| | | |
|---|---|---|
| WO | 2014/180513 A1 | 11/2014 |
| WO | 2014/180514 A1 | 11/2014 |

OTHER PUBLICATIONS

Hugl, Klaus, "Meeting the Challenges for Future Wireless Communication Needs", Inforrnationstechnisches Kolloqium, May 8, 2012, 18 pages, XP-002693254.
Hooli, Kari et al., "Winner Spectrum Aspects: Methods for efficient sharing, flexible spectrum use and coexistence", Information Society Technologies, D6.1 v1.0, Oct. 30, 2004, 88 pages.
IEEE / IEEE Std 802.11y™-2008, IEEE Standard for Information technology—Telecommunications and information exchange between systems—Local and metropolitan area networks—Specific requirements, Part 11: Wireless LAN Medium Access Control (MAC) and Physical Layer (PHY) Specifications, Amendment 3: 3650-3700 MHz Operation in USA.
Non Final Office Action for U.S. Appl. 14/890,111, dated Apr. 21, 2017, 27 pages.

* cited by examiner

COMMUNICATION MECHANISM USING CO-PRIMARY SPECTRUM SHARING

This application is a national stage entry of PCT Application No. PCT/EP2013/059711, filed on May 10, 2013, entitled "COMMUNICATION MECHANISM USING A CO-PRIMARY SPECTRUM SHARING" which is hereby incorporated by reference in its entirety.

BACKGROUND

Field

The present invention relates to apparatuses, methods, systems, computer programs, computer program products and computer-readable media usable for controlling a communication in a communication network wherein a co-primary spectrum sharing is employed.

Background Art

The following description of background art may include insights, discoveries, understandings or disclosures, or associations, together with disclosures not known to the relevant art prior, to at least some examples of embodiments of the present invention but provided by the invention. Some such contributions of the invention may be specifically pointed out below, whereas other such contributions of the invention will be apparent from their context.

The following meanings for the abbreviations used in this specification apply:
AP: access point
BS: base station
CPU: central processing unit
CR: cognitive radio
C-RNTI: cell radio network temporary identifier
DL: downlink
DRX: discontinuous reception
E-UTRAN: evolved UMTS radio access network
EGCI: E-UTRAN cell global identifier
eNB: evolved node B
FSU: flexible spectrum usage
ICIC: inter-cell interference coordination
ID: identification, identifier
ISCR individual spectrum cooperation relationship
LTE: Long Term Evolution
LTE-A: LTE Advanced
MBSFN: multimedia broadcast multicast service single frequency network
O&M: operation and maintenance
OPA, OPB: operator network A, operator network B
PDCCH: physical downlink control channel
PLMN: public land mobile network
PUCCH: physical uplink control channel
RACH: random access channel
RAN: radio access network
RF: radio frequency
RRC: radio resource control
RSRP: reference symbol received power
RSRQ: reference symbol received quality
SCR: spectrum cooperation relationship
SON: self organizing network
TA: time advance
UE: user equipment
UL: uplink
UMTS: universal mobile telecommunication system In the last years, an increasing extension of communication networks, e.g. of wire based communication networks, such as the Integrated Services Digital Network (ISDN), DSL, or wireless communication networks, such as the cdma2000 (code division multiple access) system, cellular 3rd generation (3G) and fourth generation (4G) communication networks like the Universal Mobile Telecommunications System (UMTS), enhanced communication networks based e.g. on LTE or LTE-A, cellular 2nd generation (2G) communication networks like the Global System for Mobile communications (GSM), the General Packet Radio System (GPRS), the Enhanced Data Rates for Global Evolution (EDGE), or other wireless communication system, such as the Wireless Local Area Network (WLAN), Bluetooth or Worldwide Interoperability for Microwave Access (WiMAX), took place all over the world. Various organizations, such as the 3rd Generation Partnership Project (3GPP), Telecoms & Internet converged Services & Protocols for Advanced Networks (TISPAN), the International Telecommunication Union (ITU), 3rd Generation Partnership Project 2 (3GPP2), Internet Engineering Task Force (IETF), the IEEE (Institute of Electrical and Electronics Engineers), the WiMAX Forum and the like are working on standards for telecommunication network and access environments.

Generally, for properly establishing and handling a communication connection between terminal devices such as a user device or user equipment (UE) and another communication network element or user device, a database, a server, host etc., one or more intermediate network elements such as communication network control elements, such as base stations, control nodes, support nodes or service nodes are involved which may belong to different communication network.

Basically, a communication network is typically divided into several cells controlled by a communication network control element like a BS or eNB, an O&M element and the like.

Besides a classical network environment where plural cells of the same type (e.g. plural macro cells) are arranged in a neighboring manner, new approaches are provided in order to enhance the performance of communication networks. One of these approaches is the implementation of a heterogeneous network structure. A heterogeneous network may comprise e.g. a "normal" communication cell (i.e. a macro cell) controlled by a communication network control element, such as an eNB in LTE or LTE-A networks, and plural small cells having also an own communication network control element or access network element (also referred to as an access point AP), which are referred to, for example, as local area or small cells controlled by a corresponding AP or the like. The term "small cell" is typically used to describe a low-powered radio access node or cell having a range of tens or some hundred meters. A heterogeneous network provides, for example, an improved coverage and the possibility for offloading from a communication in the macro cell to a small cell. The small cells are coupled, for example, to the communication network control element of the macro cell by a backhaul network offering high capacity, or the like.

A further approach for enhancing the performance is the so-called co-primary spectrum sharing. Co-primary spectrum sharing refers to a spectrum access model where two or more primary license holders (of the same radio service) agree on a joint usage of parts of their licensed spectrum. For example, co-primary spectrum sharing may require a mutual agreement on exact usage conditions (policies etc.) between the license holders, and it may also be necessary that a national regulator has to check and permit the entire model. For example, it is also possible that a regulator allocates a part of a communication spectrum not exclusively to a single operator but jointly to several potential users (operators)

with the obligation to use it collectively under fair conditions and subject to certain rules.

SUMMARY

According to an example of an embodiment, there is provided, for example, an apparatus comprising at least one processor, and at least one memory for storing instructions to be executed by the processor, wherein the at least one memory and the instructions are configured to, with the at least one processor, cause the apparatus at least: to conduct a processing related to set up a spectrum cooperation relationship in which a spectrum used for communication by a second communication network is allowed to be shared by at least one access network element of a first communication network, to receive and process control information indicating an establishment of a spectrum cooperation relationship between the first communication network and the second communication network, and to establish, on the basis of the control information, a communication connection path to the second communication network wherein the at least one access network element of the first communication network acts as a communication element of the second communication network.

Furthermore, according to an example of an embodiment, there is provided, for example, a method comprising: conducting a processing related to set up a spectrum cooperation relationship in which a spectrum used for communication by a second communication network is allowed to be shared by at least one access network element of a first communication network, receiving control information indicating an establishment of a spectrum cooperation relationship between the first communication network and the second communication network, processing the control information, and establishing, on the basis of the control information, a communication connection path to the second communication network wherein the at least one access network element of the first communication network acts as a communication element of the second communication network.

In addition, according to an example of an embodiment, there is provided, for example, an apparatus comprising at least one processor, and at least one memory for storing instructions to be executed by the processor, wherein the at least one memory and the instructions are configured to, with the at least one processor, cause the apparatus at least: to control a processing related to set up a spectrum cooperation relationship in which a spectrum used for communication by a second communication network is allowed to be shared by at least one access network element of a first communication network, to establish a spectrum cooperation relationship between the first communication network and the second communication network, and to cause transmission of control information to at least one access network element of the first communication network, the control information indicating the establishment of the spectrum cooperation relationship between the first communication network and the second communication network.

Furthermore, according to an example of an embodiment, there is provided, for example, a method comprising: controlling a processing related to set up a spectrum cooperation relationship in which a spectrum used for communication by a second communication network is allowed to be shared by at least one access network element of a first communication network, establishing a spectrum cooperation relationship between the first communication network and the second communication network, and causing transmission of control information to at least one access network element of the first communication network, the control information indicating the establishment of the spectrum cooperation relationship between the first communication network and the second communication network.

In addition, according to an example of an embodiment, there is provided, for example, an apparatus comprising at least one processor, and at least one memory for storing instructions to be executed by the processor, wherein the at least one memory and the instructions are configured to, with the at least one processor, cause the apparatus at least: to control a processing related to set up a spectrum cooperation relationship in which a spectrum used for communication by a second communication network being the own communication network is allowed to be shared by at least one access network element of a first communication network being another communication network, to establish a spectrum cooperation relationship between the first communication network and the second communication network, and to establish a communication connection path to at least one access network element of the first communication network wherein the at least one access network element of the first communication network acts as a communication element of the second communication network.

Moreover, according to an example of an embodiment, there is provided, for example, a method comprising: controlling a processing related to set up a spectrum cooperation relationship in which a spectrum used for communication by a second communication network being the own communication network is allowed to be shared by at least one access network element of a first communication network being another communication network, establishing a spectrum cooperation relationship between the first communication network and the second communication network, and establishing a communication connection path to at least one access network element of the first communication network wherein the at least one access network element of the first communication network acts as a communication element of the second communication network.

Furthermore, according to an example of an embodiment, there is provided, for example, an apparatus comprising at least one processor, and at least one memory for storing instructions to be executed by the processor, wherein the at least one memory and the instructions are configured to, with the at least one processor, cause the apparatus at least: to conduct a processing related to set up a spectrum cooperation relationship in which a spectrum used for communication by a second communication network is allowed to be shared by at least one access network element of a first communication network, to receive and process control information indicating an existence of an established spectrum cooperation relationship between the first communication network and the second communication network, and to prepare, on the basis of the control information, a communication connection path for requesting a secondary spectrum usage.

In addition, according to an example of an embodiment, there is provided, for example, a method comprising: conducting a processing related to set up a spectrum cooperation relationship in which a spectrum used for communication by a second communication network is allowed to be shared by at least one access network element of a first communication network, receiving control information indicating an existence of an established spectrum cooperation relationship between the first communication network and the second communication network, processing the control information, and preparing, on the basis of the control information, a communication connection path for requesting a secondary spectrum usage In addition, according to embodiments, there is provided, for example, a computer program product for a computer, comprising software code portions for performing the steps of the above defined methods, when said product is run on the computer. The computer program product may comprise a computer-readable medium on which said software code portions are stored. Furthermore, the computer program product may be directly loadable into the internal memory of the computer and/or transmittable via a network by means of at least one of upload, download and push procedures.

BRIEF DESCRIPTION OF THE DRAWINGS

Some embodiments of the present invention are described below, by way of example only, with reference to the accompanying drawings, in which.

DESCRIPTION OF EMBODIMENTS

Figure 1:
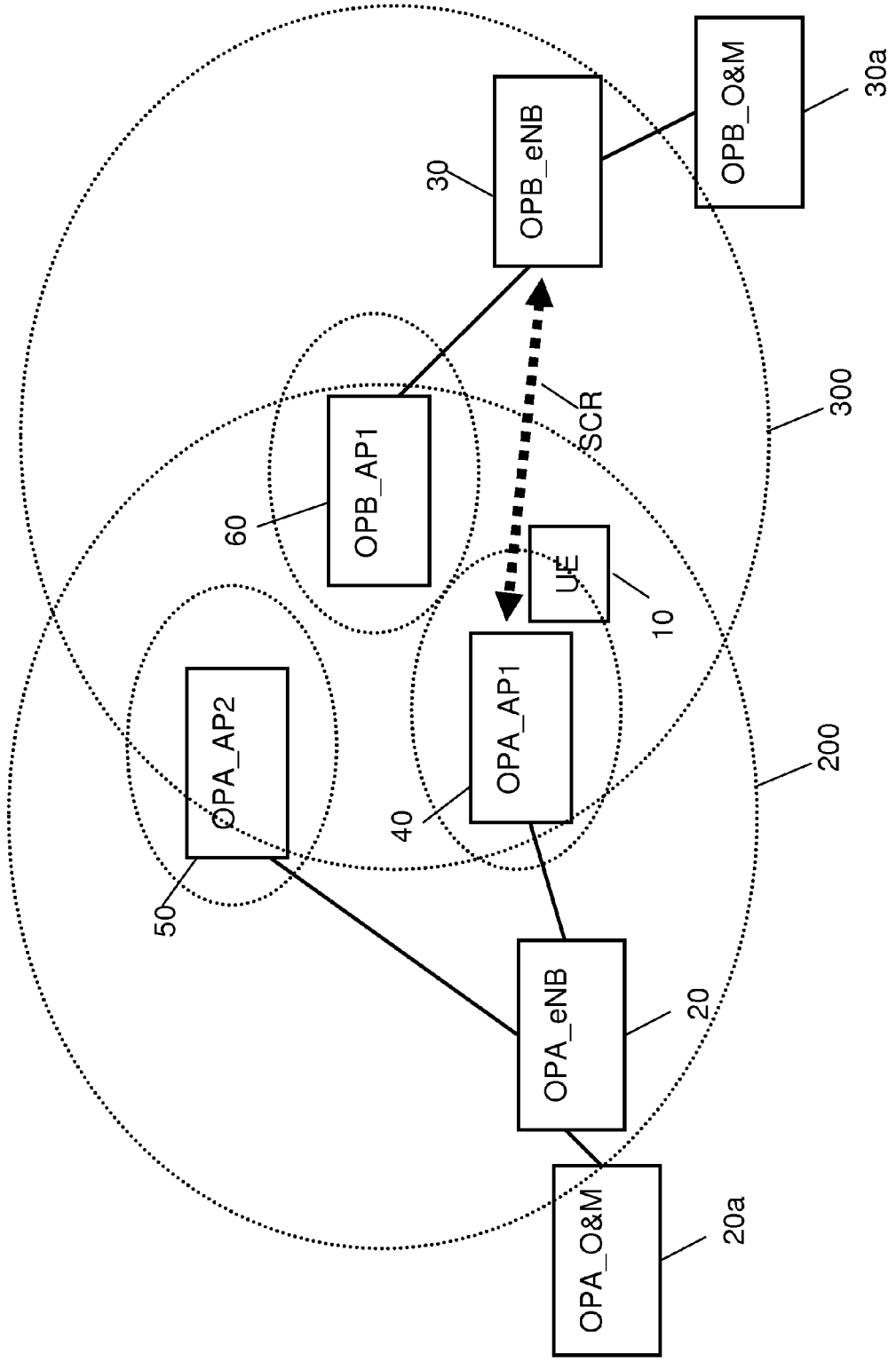
FIG. 1 shows a diagram illustrating a communication network configuration where some examples of embodiments are implemented.

In the following, some examples and embodiments are described with reference to the drawings. In the following, different exemplifying embodiments will be described using, as an example of a communication network, an LTE-Advanced based system. However, it is to be noted that the present invention is not limited to an application using such types of communication system, but is also applicable in other types of communication systems and the like.

The following embodiments are only examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may also contain also features, structures, units, modules etc. that have not been specifically mentioned.

A basic system architecture of a communication system where examples of embodiments are applicable may comprise a commonly known architecture of one or more communication networks comprising a wired or wireless access network subsystem and a core network. Such an architecture may comprise one or more communication network control elements, access network elements, radio access network elements, access service network gateways or base transceiver stations, such as a base station, an access point or an eNB, which control a respective coverage area or cell (macro cell, small cell) and with which one or more communication elements or terminal devices such as a UE or another device having a similar function, such as a modem chipset, a chip, a module etc., which can also be part of a UE or attached as a separate element to a UE, or the like, are capable to communicate via one or more channels for transmitting several types of data. Furthermore, core network elements such as gateway network elements, policy and charging control network elements, mobility management entities, operation and maintenance elements, and the like may be comprised.

The general functions and interconnections of the described elements, which also depend on the actual network type, are known to those skilled in the art and described in corresponding specifications, so that a detailed description thereof is omitted herein. However, it is to be noted that several additional network elements and signaling links may be employed for a communication to or from an access network element like an AP and a communication network besides those described in detail herein below.

The communication network is also able to communicate with other networks, such as a public switched telephone network or the Internet. The communication network may also be able to support the usage of cloud services. It should be appreciated that APs and/or eNBs or their functionalities may be implemented by using any node, host, server or access node etc. entity suitable for such a usage.

Furthermore, the described network elements, such as terminal devices or user devices like UEs, communication network control elements of a cell, like an eNB, an O&M element, access network elements like APs and the like, as well as corresponding functions as described herein may be implemented by software, e.g. by a computer program product for a computer, and/or by hardware. In any case, for executing their respective functions, correspondingly used devices, nodes or network elements may comprise several means, modules, units, components, etc. (not shown) which are required for control, processing and/or communication/signaling functionality. Such means, modules, units and components may comprise, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means comprising e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

According to some examples of embodiments of the invention, a communication mechanism related to wireless communication systems, such as 3GPP LTE-A systems, is provided which includes intelligent spectrum management aspects, such as cognitive radio (CR) aspects, wherein co-primary spectrum sharing for providing a flexible spectrum management and dynamic access schemes is used.

Cognitive radio aspects relate, for example, to a communication control scheme where available channels in a wireless communication spectrum (e.g. RF spectrum) are detected, the best available wireless channels in the vicinity of a corresponding communicating network element (such as an AP or the like) are selected and then accordingly transmission and reception parameters are changed accordingly to use the selected channels. This enhances the overall performance in the communication network by utilizing available resources in a given spectrum at a certain location.

When combining a co-primary sharing access mode and cognitive radio access procedures, higher peak data rates for end users as well as higher capacity and wider coverage are achievable. According to some examples, a shared spectrum usage is especially beneficial and appropriate for small cell deployments (heterogeneous network scenario), for example since small cells may be more isolated than larger macro cells. According to some examples of embodiments, a system scenario is discussed where a wide area with exclusive spectrum for each operator is provided, while small cells of multiple operators being controlled by a respective macro cell can share the common spectrum pool in co-primary way.

Specifically, according to some examples of embodiments, a mechanism is provided which does not depend on well deployed backhaul connections (e.g. LTE S1 and X2 interfaces) among cells of different operators. According to some examples of embodiments, the co-primary spectrum usage is controlled in fast and dynamic way between multiple operators. That is, according to some examples of embodiments, coordination of the co-primary spectrum usage (within a certain local area) among small cells of multiple operators is provided. Hence, it is possible to avoid or at least minimize mutual interferences among the small cells using the shared spectrum.

Furthermore, by virtue of some embodiments, it is possible to provide an enhanced mechanism which allows avoiding of the sharing spectrum to be excessively used by single operators.

With regard to FIG. 1, a diagram illustrating a general configuration of a communication network where some examples of embodiments of the invention are implemented is shown. It is to be noted that the configuration shown in FIG. 1 shows only those devices, network elements and/or parts which are useful for understanding principles underlying the examples of embodiments. As also known by those skilled in the art there may be several other network elements or devices involved in a communication network which are omitted here for the sake of simplicity.

In FIG. 1, a communication network configuration is illustrated in which some examples of embodiments are implementable. The network according to FIG. 1 is for example based on the 3GPP specifications and comprises elements of a heterogeneous network including one or more wide area cells (macro cell) and one or more local area cells (small cells), and elements of parallel (neighboring) macro cells and small cells. It is to be noted that the general functions of the elements described in connection with FIG. 1 as well as of reference points/interfaces between the elements are known to those skilled in the art so that a detailed description thereof is omitted here for the sake of simplicity.

The term "neighboring cell" is to be understood in such a manner that the respective cells have at least partly overlapping coverage areas for their radio connections towards a communication element so that it is possible that an communication element or the access network element can communicate with the neighboring cell via a radio connection. In other words, neighboring cells are those cells which represent candidates for a handover to and from each other, wherein of course more than two cells can be neighboring cells to each other, depending on the current network architecture, communication conditions, etc.

As shown in FIG. 1, in the exemplary communication network system, two neighboring macro cells 200 and 300 are provided. Cells 200 and 300 are respective part of a communication network of a first operator (OPA) and a second operator (OPB), respectively, wherein each operator's exclusive (RF) spectrum is used in each cell.

Each of the macro cells 200, 300 is controlled by a corresponding communication network control element comprising, e.g. a (macro) eNB (OPA_eNB 20 of operator network OPA) and an O&M element (OPA_O&M 20a) of the first operator network OPA, or a (macro) eNB (OPB_eNB 30 of operator network OPB) and an O&M element (OPB_O&M 30a) of the second operator network OPB. According to some examples of embodiments, the communication control network elements of the respective different networks, such as OPA_eNB 20 and OPB_eNB 30, are configured to communicate with each other by means of a communication path involving, for example, the core networks of the operator networks, or another communication path, such as the Internet, a dedicated connection, etc.

Connected to the respective communication network control element of the macro cell 200, 300, one or more small cells are included in a heterogeneous network structure. Specifically, to the macro cell 200 (i.e. the OPA_eNB 20), small cells controlled by a respective access network element or AP, i.e. OPA_AP1 40 and OPA_AP2 50 are linked, while to the macro cell 300 (i.e. the OPB_eNB 30) small cell controlled by access network element or AP OPB_AP1 60 is linked. It is to be noted that the number of linked small cells (and respective APs) is not limited to the numbers indicated above.

It is to be noted that according to some examples of embodiments, the small cell of a respective operator network, such as OPA_AP1 40 and OPA_AP2 50 (the same applies for OPB and respective elements) may be under control of the macro cell to which they are connected (i.e. controlled by the OPA_eNB 20, for example). That is, the macro cell communication network control element is configured to execute several control procedures for the respective small cell AP, such as control, allocation and/or coordination of a flexible spectrum usage of the small cells (the small cell APs, such as OPA_AP1 40).

According to examples of embodiments, the APs of the respective small cells and the communication network control element of the respective operator are connected by interfaces using a backhaul network or another connection type, such as a wired or wireless communication line, or the like. Furthermore, as indicated in FIG. 1, a communication element or device (UE 10) is located in the small cell of OPA_AP1 40, wherein it is assumed that a connection between OPA_AP1 40 and UE 10 is established.

It should be appreciated that according to some examples, a so-called "liquid" or flexible radio concept is employed where the operations and functionalities of a communication network control element or of another entity of the communication network, such as of one or more of the shown eNBs or APs, may be performed in different entities, such as a node, host or server, in a flexible manner. In other words, a "division of labour" between involved network elements or entities may vary case by case. One possible alternative to the example illustrated is, for example, to make a base station or the like to deliver local content.

It is to be noted that even though FIG. 1 shows two macro cells 200 and 300, the number of cells is not limited thereto and can be more than two, wherein at least respective two cells are neighboring cells.

In the example shown in FIG. 1, it is now assumed that the co-primary spectrum is shared among the multiple operators for local area small cells, in which the shared spectrum is divided into multiple chunks wherein each operator (e.g. OPA and OPB, respectively) uses one chunk as the primary user for its own small cells. According to examples of embodiments, one operator (e.g. OPB) may grant a usage right for its primary spectrum chunk to the other operator's small cells as secondary users (i.e. a secondary spectrum usage).

Specifically, an example is indicated where the small cell of OPA_AP1 is allowed to use in form of a secondary spectrum usage an allowed part of the spectrum of OPB. That is, the OPB communication network control element (e.g. OPB_eNB 30 or OPB_O&M 30a) grants a usage right for a part of the primary spectrum chunk to the OPA_AP1 40 as a secondary user. This is indicated in FIG. 1 by a dashed arrow indicating a spectrum cooperation relationship between the networks of OPA and OPB with regard to the access network element OPA_AP1 40.

Figure 2:
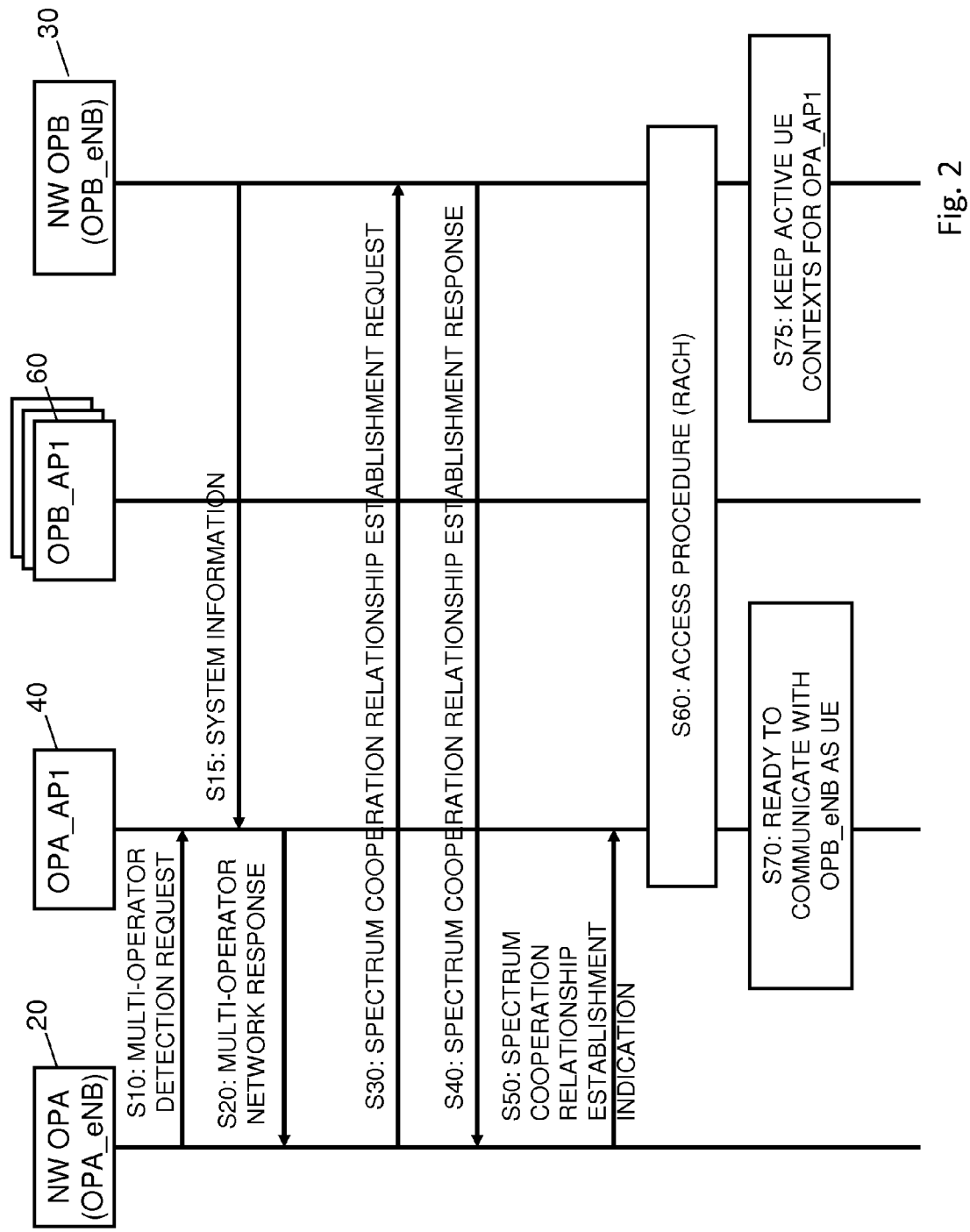
FIG. 2 shows a signaling diagram illustrating a communication control using a spectrum cooperation relationship according to some examples of embodiments.

In FIG. 2, a signalling diagram is shown which illustrates a communication control using a spectrum cooperation relationship according to some examples of embodiments. Specifically, the example of FIG. 2 is related to an establishment of a spectrum cooperation relationship between the communication networks of OPA and OPB for allowing that a secondary spectrum usage of one small cell (e.g. of OPA_AP1 40) is granted.

As indicated above, according to examples of embodiments, the co-primary spectrum is shared among the multiple operators for local area small cells. The operator (e.g. OPB) may grant a usage right for its primary spectrum chunk to other operators as the secondary users. In FIG. 2, examples for setting up the spectrum cooperation relationship between a small cell AP of one operator (here of OPA_AP1 40) and the other operator network (here OPB) are illustrated. When the spectrum cooperation relationship is established, the small cell AP can communicate with the second network (i.e. a serving cell of OPB, such as OPB_eNB 30) as an active communication element, i.e. as an active UE, for secondary spectrum usage coordination.

The procedure indicated in FIG. 2 may be executed, for example, during a deployment of a small cell of OPA, a reconfiguration thereof or in a reset case. One possible further condition is that small cells of OPA are allowed and able to use the primary spectrum chunk of OPB as a secondary user.

In order to set up the sharing spectrum cooperation relationship with the OPB network, the small cell AP (OPA_AP1 40) executes a detection of the other network, i.e. of OPB network, preferably of the macro network or cell 300 of OPB. For this purpose, for example, system information provided by the OPB network (in form of broadcasting messages) in S15 are detected and processed, for example.

The detection may be started by the OPA_AP1 40 itself, e.g. as a SON feature, or a request to start a multi-operator detection is sent from the OPA network (e.g. the OPA_eNB 20 or the OPA_O&M 20a) in S10.

According to some examples, in order to facilitate the detection conducted by the small cell OPA_AP1 40, the OPA_AP1 40 may be (pre-)configured with OPB's network related information, such as RF channels and PLMN identifiers thereof. This configuration information is provided e.g. by the request message in S10 or by a separate signaling (not shown). Based on the information, the OPA_AP1 40 then searches the OPB's network.

When the detection or a phase thereof is finished, in S20, OPA_AP1 40 reports the detection result of OPB's network to the OPA network (e.g. the OPA_eNB 20 or the OPA_O&M 20a), for example as a response to the message in S10 or as a separate message. The report comprises, for example, cell identifiers (e.g. EGCI), downlink measurements (e.g. RSRP and/or RSRQ) etc. with regard to the OPB network. Furthermore, for example, in case more than one cell (macro cells and/or small cells) from the multiple operators' network (OPB network) are detected, the OPA_AP1 40 may relate the report sent in S20 to the strongest cell from each operator's network, or to all the detected cells from all the relevant operators.

Based on the detection report from OPA_AP1 40 in S20, the OPA network (e.g. the controlling OPA_eNB 20 of the OPA_AP1 40 or the OPA_O&M element 20a) initiates a setup or an establishment of a sharing spectrum cooperation relationship with OPB network. For this purpose, in S30, a spectrum cooperation relationship establishment request is sent to a selected operator (e.g. OPB) network, e.g. to a communication network control element like OPB_eNB 30 indicated in the report. For example, the spectrum cooperation relationship establishment request may include information on IDs of detected OPB's cell(s) (macro/small cells), and information of the small cell AP for which the secondary spectrum usage may be requested (i.e. OPA_AP1 40) as well as a capability information indicating the capability of the OPA_AP1 40 to act as an UE entity.

It is to be noted that the spectrum cooperation relationship establishment request can be sent in S30 to the selected operator (e.g. OPB) network by different communication paths, as indicated above. For example, a direct communication path, a communication path directed via core network elements, a communication path via the Internet, etc., may be used for conveying the respective message to the target operator network.

Moreover, it is to be noted that the OPA network may conduct a selection procedure for determining a target operator or cell for the establishment of the spectrum cooperation relationship. This selection procedure may be based on an algorithm and can consider e.g. current detection results, history data, pre-selection parameters etc.

Upon receiving the request in S30, the OPB network (e.g. OPB_eNB 30 or OPB_O&M 30a) may determine a macro cell of the OPB network which shall serve to the small cell AP (OPA_AP1 40) for requesting a secondary spectrum usage right (for example on the basis of a selection procedure conducted in the OPB_eMN 30 or OPB_O&M 30a, or by using a (pre-)selection indication from OPA network). Furthermore, relevant UE contexts information may be determined enabling an access to the determined serving cell as a UE (for example, a C-RNTI, scheduling request configuration, signaling radio bearer configuration, DRX configuration, security configuration etc.).

In S40, in reply to the request in S30, the OPB network, e.g. OPB_eNB 30, sends a spectrum cooperation relationship establishment response to the OPA network (e.g. OPA_eNB 20). The spectrum cooperation relationship establishment response comprises e.g. an ID of the determined serving cell of OPB for the small cell AP of OPA, information about the primary spectrum of OPB, and the determined UE context information.

As in case of S30, also in S40 the spectrum cooperation relationship establishment response can be sent to the requesting operator (e.g. OPA) network by the same communication paths, for example, via a direct communication path, a communication path directed via core network elements, a communication path via the Internet, etc.

After receiving the spectrum cooperation relationship establishment response in S40, the communication network control element of OPA (e.g. OPA_eNB 20 or OPA_O&M 20a)) provides the relevant information to the small cell AP (OPA_AP1 40) as control information indicating the establishment of the spectrum cooperation relationship.

In S60, based on the control information, the OPA_AP1 40 executes an access procedure to the serving cell identified in the control information by using the UE context information. That is, in S60, the OPA_AP1 40 and the serving cell of OPB (e.g. OPB_eNB 30) executes an access procedure wherein the OPA_AP1 40 acts like a UE trying to connect to the serving cell of OPB. For example, a RACH procedure using the indicated UE context information is executed. By means of this access procedure, the cooperation relationship establishment is confirmed. Furthermore, the OPA_AP1 40 learns required timing advance information towards to the indicated serving cell.

As a result of the access procedure in S60, in S70, a communication connection path is established and the OPA_AP1 40 is ready to communicate with the serving cell (OPB_eNB 30) of the OPB network for requesting a grant of a secondary spectrum usage, e.g. in the way as an RRC connected state UE of OPB. On the other hand, in S75, the serving cell (OPB_eNB 30) keeps active UE contexts for the OPA_AP1 40. That is, an air interface representing a spectrum cooperation communication opportunity is provided.

It is to be noted that a spectrum cooperation opportunity may be provided also in another manner. For example, a spectrum cooperation may be programmed by an operator with measurements or a detection for the other communication network (OPB network) which is conducted by an access network element or the like (i.e. pre-configured spectrum cooperation).

In the following, examples for coordinating a secondary spectrum usage by access network elements of small cells based on an established spectrum cooperation relationship are described.

Figure 3:
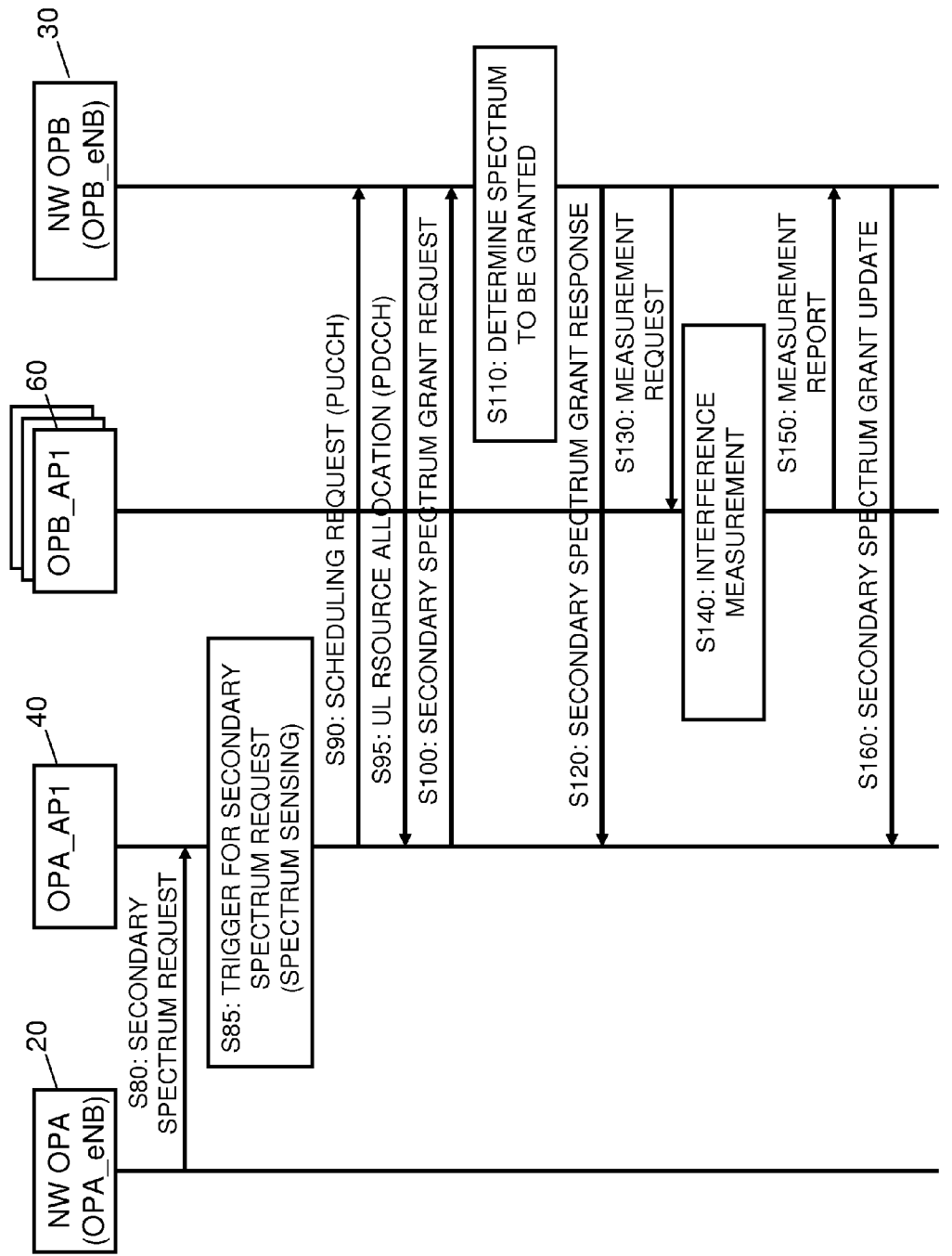
FIG. 3 shows a signaling diagram illustrating a communication control using a spectrum cooperation relationship according to some examples of embodiments.

FIG. 3 shows a signaling diagram illustrating a communication control using a spectrum cooperation relationship according to some examples of embodiments wherein a secondary spectrum usage granting is individually conducted for each access network element of a small cell, if desired. The control scheme of FIG. 3 is used e.g. in case there has been granted no other secondary spectrum usage so far (i.e. an initial secondary spectrum usage grant).

In the following, it is assumed that a communication connection path is established between at least one access network element (small cell, e.g. OPA_AP1 40) and the OPB network (e.g. to OPB_eNB 30). For example, this is done in accordance with the processing described in connection with FIG. 2.

According to the present example, OPA_AP1 40 shall request for a secondary spectrum usage. For this purpose, as indicated above, the OPA_AP1 40 may communicate, as an RRC connected state UE of OPB, with the serving OPB_eNB 30 for secondary spectrum usage coordination.

The request for a secondary spectrum usage may be triggered, for example, by the OPA's network (e.g. the controlling OPA_eNB 20 or the OPA_O&M 20a), as indicated in S80, by sending a request to the OPA_AP1 40. This is the case, for example, when a primary spectrum chunk sharing among small cells of the OPA network is centrally controlled by the controlling OPA_eNB 20 or the OPA_O&M 20a. According to further examples, in this case, the request message in S80 used as a trigger indication includes information which operator network and which serving cell is to be used for the secondary spectrum usage request, for example corresponding PLMN IDs, primary spectrum information, etc.

It is to be noted that according to some examples, the access network element which shall request the secondary spectrum usage may also conduct an operation where an access procedure like that of S60 is conducted in response to a trigger indication according to S80, i.e. the communication connection path is established when a target cell or operator is indicated by the controlling OPA_eNB 20 or OPA_O&M 20a in S80.

Alternatively, according to S85, the request for a secondary spectrum usage may be triggered, for example, by an internal processing in the small cell AP (OPA_AP1 40) itself, for example in case the primary spectrum chunk sharing is coordinated in distributed way among the small cells in the OPA network. In this case, the OPA_AP1 40 may be configured with information about conditions and/or rules for triggering the secondary spectrum grant request (e.g. primary spectrum chunk interference threshold for requesting secondary spectrum, interference threshold for selecting secondary spectrum chunk), wherein also a sensing of corresponding parameters is included, if required.

Even though not shown in FIG. 3, another trigger for a secondary spectrum usage request may be a request for secondary spectrum usage by another network element, such as another small cell, which will be discussed later.

As further illustrated in FIG. 3, upon recognizing a valid trigger in S80 or S85, the OPA_AP1 40 may use in S90 a configured uplink scheduling request (e.g. on PUCCH channel) to contact serving eNB (OPB_eNB 30) and receive in S95 an indication of allocated UL resources. Then, in S100, the OPA_AP1 40 sends a secondary spectrum grant request on the allocated UL resources to the serving OPB_eNB 30. The secondary spectrum grant request may include information on sensing results (e.g. IDs of detected small cells of the OPB network, a received signal strength or interference power with regard thereto) related to a requested secondary spectrum, which facilitates a processing of the OPB network for granting a usage right of a certain spectrum.

Based on the information provided by the OPA_AP1 40 in the request message of S100, the OPB network (e.g. the serving OPB_eNB 30 or OPB_O&M 30*a*) determines in S110 the spectrum that can be allocated (or granted) to the OPA_AP1 40 for use as a secondary user. In S120, the OPB network sends, as a response to the request message of S100, a secondary spectrum grant response message to the OPA_AP1 40, which includes information about the granted spectrum and also the usage conditions (for example communication timing information, power restrictions etc.).

According to some examples, in case the small cell AP (here OP_AP1 40) is not configured to communicate simultaneously with the serving eNB of OPB and a UE which is served by the small cell (e.g. UE 10 in FIG. 1), the small cell AP may either temporarily interrupt the small cell operation (e.g. by configuring MBSFN subframes) or may select one of the served UEs (e.g. UE 10) to communicate with the serving eNB of OPB on behalf of itself.

Furthermore, according to some examples, when a secondary spectrum usage is granted by the OPB network to a small cell of the OPA network (e.g. OPA_AP1 40), the OPB network may initiate a measurement of interference caused by OPA_AP1 40 in the OPB network. For this purpose, for example, in S130, the OPB network (e.g. OPB_eNB 30 or OPB_O&M 301) sends a request to one or more small cells of OPB network (i.e. OPB_APs 60) to measure the interference on the granted spectrum and to report at least strong interferences caused by the OPA_AP1 40. The request in S130 may comprise, for example, information about the granted spectrum and information for identifying the OPA_AP1 40.

In S140, the OPB_APs 60 conduct corresponding interference measurements, and report in S150 a result of the interference measurements. On the basis of the report in S150, the OPB network can decide whether the interference is tolerable or not. If not, the OPB network may either update the spectrum grant to the OPA_AP1 40 given in S120, or even withdraw the granted spectrum.

A corresponding secondary spectrum grant update is sent to the OPA_AP1 40 in S160, wherein the update information comprises information about a modified granted spectrum and/or about modified usage conditions. In order to enable the OPB network (e.g. the OPB_eNB 30) to initiate a communication with OPA_AP1 40 for updating the spectrum grant, the OPA_AP1 40 is set to follow a DRX configuration from the OPB network so as to check the DL/UL resource allocation from the serving OPB_eNB 30.

As described in connection with FIG. 2 and FIG. 3, a spectrum cooperation relationship between a small cell AP of one operator network (e.g. OPA) and a cell (an eNB) of another operator network (e.g. OPB) is established, and on the basis of the established individual spectrum cooperation relationship a secondary spectrum usage is communicated between this small cell AP and the serving cell (with the small cell representing an active UE of the serving cell). This allows a fast way to coordinate the spectrum usage between different operators.

However, in an area with a dense deployment of small cells, the establishment of a spectrum coordination relationship for each small cell AP, an approach using already established spectrum cooperation relationships may be further advantageous, in particular with regard to scalability issues.

Correspondingly, in the following, further examples of embodiments for a communication control using a spectrum cooperation relationship between the communication networks of OPA and OPB for allowing that a secondary spectrum usage of a small cell is granted and for a coordination of the secondary spectrum usage by an access network element of a small cell based on an established spectrum cooperation relationship are described.

FIGS. 4 to 7 show a respective signaling diagram illustrating a communication control using a spectrum cooperation relationship according to some examples of embodiments. According to these further examples as illustrated in these FIGS. 4 to 7, it is assumed that there is already established a spectrum cooperation relationship between OPA and OPB, i.e. between e.g. one access network element of a small cell of OPA (for example, OPA_AP1 40) and a serving eNB of the OPB network (for example, OPB_eNB 30). According to some examples, the established spectrum cooperation relationship comprises also that a secondary spectrum usage is granted so that OPA_AP1 40 has already a part of the spectrum of OPB assigned to. However, examples of embodiments work also in cases where only the spectrum cooperation relationship is established, while any spectrum usage granting for a small cell are not (yet) conducted.

That is, according to the present examples, an established spectrum cooperation relationship between an access network element of a small cell of one communication network (OPA network) and a serving cell of another operator network (OPB network), is used to create and maintain spectrum cooperation opportunities for the small cells of multiple operators. Consequently, it is not required for every small cell to set up an individual spectrum cooperation relationship with other operator's network for coordinating the shared spectrum usage.

It is to be noted that the examples described in connection with FIGS. 4 to 7 may be carried out in the context of the example according to FIG. 2, where a spectrum cooperation relationship is established as described therein for one small cell, but they are not limited to such an implementation. That is, examples corresponding to the following description are also suitable to be used in cases where any kind spectrum coordination is available for at least one access network element and at least one other access point may utilize this spectrum coordination in a cooperative manner.

Figure 4:
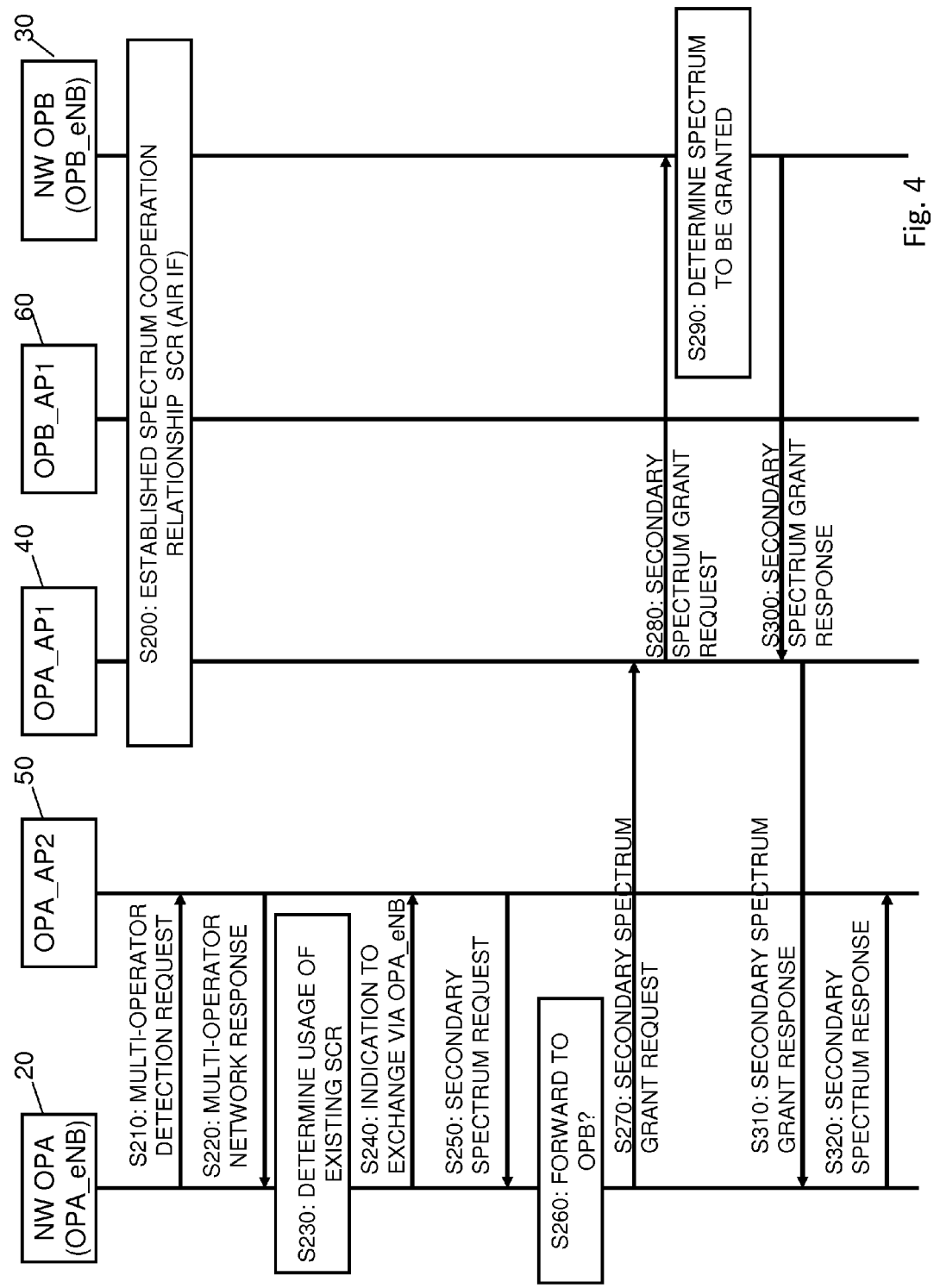
FIG. 4 shows a signaling diagram illustrating a communication control using a spectrum cooperation relationship according to some examples of embodiments.

Referring to FIG. 4, in S200, it is assumed that a spectrum cooperation relationship is established between at least one access network element of a small cell of OPA network (e.g. OPA_AP1 40) and a serving cell of the OPB network. In other words, a communication connection path or air interface between the networks for secondary spectrum usage coordination is already established. For example, this is done in accordance with the processing described in connection with FIG. 2, but also other spectrum coordination opportunities are usable.

When a small cell of the OPA network (e.g. OPA_AP2 50) is allowed or instructed to set up a sharing spectrum cooperation relationship with another network (e.g. the OPB network), the small cell AP (OPA_AP2 50) executes a detection of the other network, i.e. of OPB network, preferably of the macro network or cell 300 of OPB. For this purpose, for example, system information provided by the OPB network (in form of broadcasting messages) are detected and processed.

The detection may be started by the OPA_AP2 50 itself, e.g. as a SON feature, or a request to start a multi-operator detection is sent from the OPA network (e.g. the OPA_eNB 20 or the OPA_O&M 20a) in S210.

According to some examples, in order to facilitate the detection conducted by the small cell OPA_AP2 50, the OPA_AP2 50 may be (pre-)configured with OPB's network related information, such as RF channels and PLMN identifiers thereof. Furthermore, according to some examples, also information regarding IDs of small cells having already an established spectrum cooperation relationship, i.e. a communication connection path (air interface) established to another network (e.g. OPA_AP1 40) is provided. The configuration information is provided e.g. by the request message in S210 or by a separate signaling (not shown). Based on the information, the OPA_AP2 50 then searches the OPB's network and the other small cells with established SCR.

When the detection is finished, in S220, OPA_AP2 50 reports the detection result of OPB's network (and possibly of the other small cells with established SCR) to the OPA network (e.g. the OPA_eNB 20 or the OPA_O&M 20a), for example as a response to the message in S210 or as a separate message. The report comprises, for example, cell identifiers (e.g. EGCI), downlink measurements (e.g. RSRP and/or RSRQ) etc. with regard to the OPB network (and the other small cells). Furthermore, for example, in case more than one cell (macro cells and/or small cells) from the multiple operators' network (OPB network) are detected, the OPA_AP2 50 may relate the report sent in S220 to the strongest cell from each operator's network, or to all the detected cells from all the relevant operators.

On the basis of the received report, the OPA network (i.e. OPA_eNB 20 or OPA_O&M 20a) may determine in S230 to utilize the available spectrum cooperation opportunity for OPA_AP2 50 without establishment of a separate SCR for OPA_AP2 50 with OPB network. That is, it is decided in S230 that at least some of the small cells of OPA for which a secondary spectrum usage is desired may use the already established SCR to communicate with the other operator's (OPB) network for spectrum coordination.

The determination in S230 may be based on different parameters.

For example, the general availability of small cells that have an established SCR with other operator's network is checked. In the present example, the small cell having the established SCR may be from same operator network (OPA network) with the same controlling eNB (OPA_eNB1 20) as the small cell (OPA_AP2 50) for which a secondary spectrum usage grant possibility is set up, wherein the small cell having the SCR established is preferably reachable by the small cell in question (i.e. OPA_AP2 50 can communicate with OPA_1 40) either via direct interface or through controlling eNB (OPA_eNB1 20). Another alternative where the respective small cells are of different OP networks will be described later.

Furthermore, the determination in S230 may be also based on an available capacity of the established SCR. For instance, a capacity related information may be derived from a scheduling request and DRX configuration information of UE context information (such as those provided by serving OPB_eNB 30 in step S40 of FIG. 1). In addition, the serving OPB_eNB 30 may also provide other capacity related information e.g. in the form of how many small cell APs can utilize the SCR for delivery of secondary spectrum usage request procedure related messages or how often the established SCR can be used for secondary spectrum usage request.

It is to be noted that the determination in S230 may be based on other information than that provided in S220, depending on the kind of spectrum cooperation opportunity and the setting thereof.

In the example according to FIG. 4, after the usage of the existing SCR is determined in S230, the OPA network (e.g. controlling OPA_eNB 20 or OPA_O&M 20a) may, based on the determination of available spectrum cooperation opportunity, inform in S240 the small cell AP in question (i.e. OPA_AP2 50), e.g. in the form of control information, that any signaling related to a secondary spectrum usage request procedure is to be forwarded to the controlling OPA_eNB 20, i.e. to be exchanged with other operator's network (OPB network) via OPA_eNB 20. Consequently, the OPA_AP2 50 prepares a corresponding signaling path for a secondary spectrum usage request towards the OPA_eNB 20.

Next, a coordination procedure of a secondary spectrum usage by the OPA_AP2 50 based on the information in S240 and by using the prepared signaling path is conducted on the basis of the established spectrum cooperation relationship.

Specifically, in S250, OPA_AP2 50 requests a secondary spectrum usage with regard to a spectrum of OPB. A trigger of the request may be in accordance with that described in connection with FIG. 3 at S80 or S85.

The request may comprise, for example, information regarding a secondary spectrum sensing result (if conducted by the OPA_AP2 50), and information about IDs of small cells of the OPB network (i.e. OPB_AP1 60).

In S260, the controlling OPA_eNB 20 of the small cell AP requesting the secondary spectrum usage, i.e. OPA_AP2 50, may determine, upon receiving the secondary spectrum usage request in S250, whether the request for granting a secondary spectrum usage is to be forwarded to the OPB network. If the decision is positive, a small cell having SCR, i.e. OPA_AP1 40, is selected for conveying the request to the OPB network. The selection, if plural small cells having SCR are available, may be based on different parameters, such as availability, capacity and transmission opportunity of the established SCR. For example, the small cell that has the earliest transmission possibility to its ISCR serving eNB may be selected for conveying the request.

Hence, according to some examples, there may be executed two determination processes in the OPA_eNB 20. One is to determine if there is any existing SCR which can be used when an SCR is decided to be setup for an AP. The other one is to determine if there is any granted secondary spectrum that can be used when a secondary spectrum usage is requested by another AP.

Correspondingly, in S270, the OPA_eNB 20, if the secondary spectrum request is to be forwarded to the other operator's network (OPB), may use the established communication connection path (air interface) of the small cell AP with the SCR (OPA_AP1 40). The secondary spectrum grant request messages may comprise, for example, information about a secondary spectrum sensing result, an identification of detected small cells of OPB, and an information indicating the ID of the small cell requesting the secondary spectrum usage (i.e. of OPA_AP2 50) since the current request is not for the small cell having the SCR (i.e. OPA_AP1 40). In S280, the secondary spectrum grant request is forwarded to the OPB (i.e. OPB_eNB 30).

At the OPB side, as in case of the processing in FIG. 3, the secondary spectrum grant request is processed in S290 so as to determine the spectrum to be granted. Then, in S300, a secondary spectrum grant response message is sent back to the OPA via the communication connection path towards the OPA_AP1 40, wherein the secondary spectrum grant response message indicates the granted spectrum information, usage conditions and also the ID of OPA_AP2 50 for which the spectrum is granted (again since the current granting is not for the small cell having the SCR, i.e. OPA_AP1 40). The OPA_AP1 40 forwards the secondary spectrum grant response message in S310 to the controlling OPA_eNB 20.

In S320, the OPA_eNB 20 informs the requesting small cell AP (OPA_AP2 50) about the grant of the secondary spectrum usage by sending a response to the secondary spectrum request of S250 including the granted spectrum information and the usage conditions.

On the other hand, the determination in S260 may be also negative, i.e. a forwarding of the request to the OPB network is decided to be not necessary. This is the case, for example, when a relevant small cell detection result is available in controlling OPA_eNB 20 and if some secondary spectrum usage right has been previously granted. In this case, the controlling OPA_eNB 20 may coordinate the granted spectrum usage among the small cell making the current request (i.e. OPA_AP2 50) and the small cell which is detected by OPA_AP2 50, i.e. OPA_AP1 40. Correspondingly, the request in S250 may be directly responded by the OPA_eNB 20 with the secondary grant response message in S320 indicating the granted spectrum information and the usage conditions.

Figure 5:
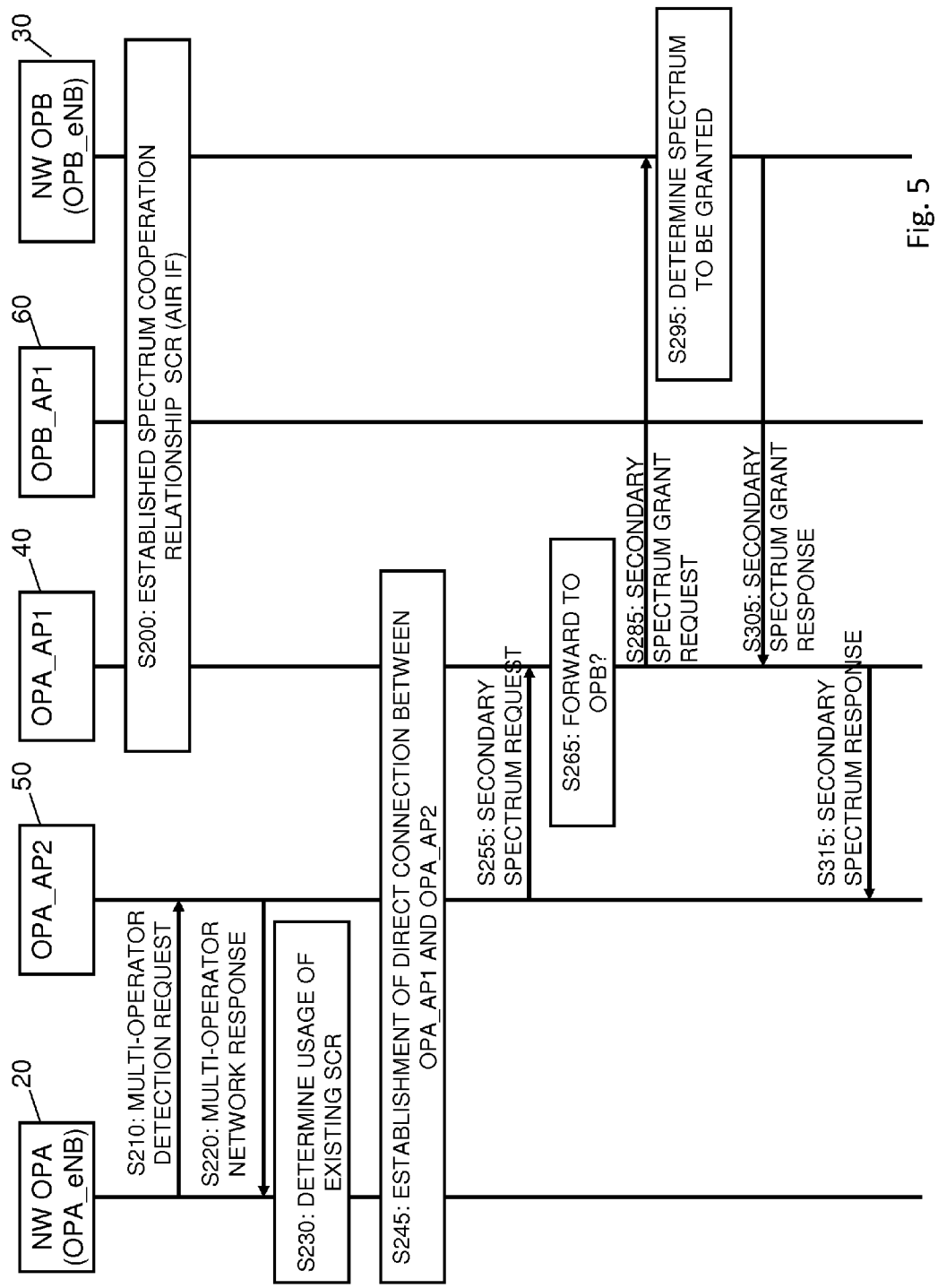
FIG. 5 shows a signaling diagram illustrating a communication control using a spectrum cooperation relationship according to some examples of embodiments.

FIG. 5 illustrates an alternative to the processing of FIG. 4 beginning after S230. That is, the processing described in connection with FIG. 4 regarding S200 to S230 is equivalent to the processing for S200 to S230 in FIG. 5, so that a repetition of the description thereof is omitted here.

According to the examples related to the processing according to FIG. 5, in order to further enhance a spectrum usage related message exchange, the small cell AP in question (i.e. OPA_AP2 50) may be configured to detect the relevant small cells with established SCR (e.g. OPA_AP1 40) and report the detected small cells with established SCR to its controlling OPA_eNB 20 with the message in S230 or by separate message. Based on the reporting, e.g. when the OPA_AP2 50 reports the detection of the OPA_AP1 40, the controlling OPA_eNB 20 may initiate or coordinate an establishment of a bi-directional direct connection (e.g. an over-the-air link) between the two small cell APs (i.e. OPA_AP1 40 and OPA_A2 50) in S245. Thus, the small cell AP in question (OPA_AP2 50) is able to directly communicate with the small cell with SCR (OPA_AP1 40) in case a spectrum usage related message exchange is required (e.g. when a secondary spectrum request is to be made). For example, the direct connection can be established in that the OPA_AP2 50 accesses to OPA_AP1 40 (the small cell with SCR) as a UE for over-the-air communication.

Consequently, the OPA_AP2 50 prepares a corresponding signaling path for a secondary spectrum usage request towards the OPA_AP1 40.

Next, a coordination procedure of a secondary spectrum usage by the OPA_AP2 50 based on the direct connection established in S245 (i.e. by using the prepared signaling path) is conducted.

Specifically, in S255 OPA_AP2 50 requests a secondary spectrum usage with regard to a spectrum of OPB. A trigger of the request may be in accordance with that described in connection with FIG. 3 at S80 or S85.

The request may comprise, for example, information regarding a secondary spectrum sensing result (if conducted by the OPA_AP2 50), and information about IDs of small cells of the OPB network (i.e. OPB_AP1 60).

In S265, the OPA_AP1 40 may determine, upon receiving the secondary spectrum usage request in S255, whether the request for granting a secondary spectrum usage is to be forwarded to the OPB network. If the decision is positive, OPA_AP1 40 sends in S285 the secondary spectrum request to the other operator's network (OPB) (i.e. OPB_eNB 30) via the established communication connection path (air interface) of OPA_AP1 40. The secondary spectrum grant request messages may comprise, for example, information about a secondary spectrum sensing result, an identification of detected small cells of OPB, and an information indicating the ID of the small cell requesting the secondary spectrum usage (i.e. of OPA_AP2 50) since the current request is not for the small cell having the SCR (i.e. OPA_AP1 40).

At the OPB side, as in case of the processing in FIG. 3, the secondary spectrum grant request is processed in S295 so as to determine the spectrum to be granted. Then, in S305, a secondary spectrum grant response message is sent back to the OPA via the communication connection path towards the OPA_AP1 40, wherein the secondary spectrum grant response message indicates the granted spectrum information, usage conditions and also the ID of OPA_AP2 50 for which the spectrum is granted (again since the current granting is not for the small cell having the SCR, i.e. OPA_AP1 40).

In S315, the OPA_AP1 40 informs the requesting small cell AP (OPA_AP2 50) about the grant of the secondary spectrum usage by sending a response to the secondary spectrum request of S255 including the granted spectrum information and the usage conditions.

On the other hand, the determination in S265 may be also negative, i.e. a forwarding of the request to the OPB network is decided to be not necessary. In this case, the OPA_AP1 40 may coordinate the granted spectrum usage among itself and the small cell making the current request (i.e. OPA_AP2 50). Correspondingly, the request in S255 may be directly responded by the OPA_AP1 40 with the secondary grant response message in S315 indicating granted spectrum information and the usage conditions.

Figure 6:
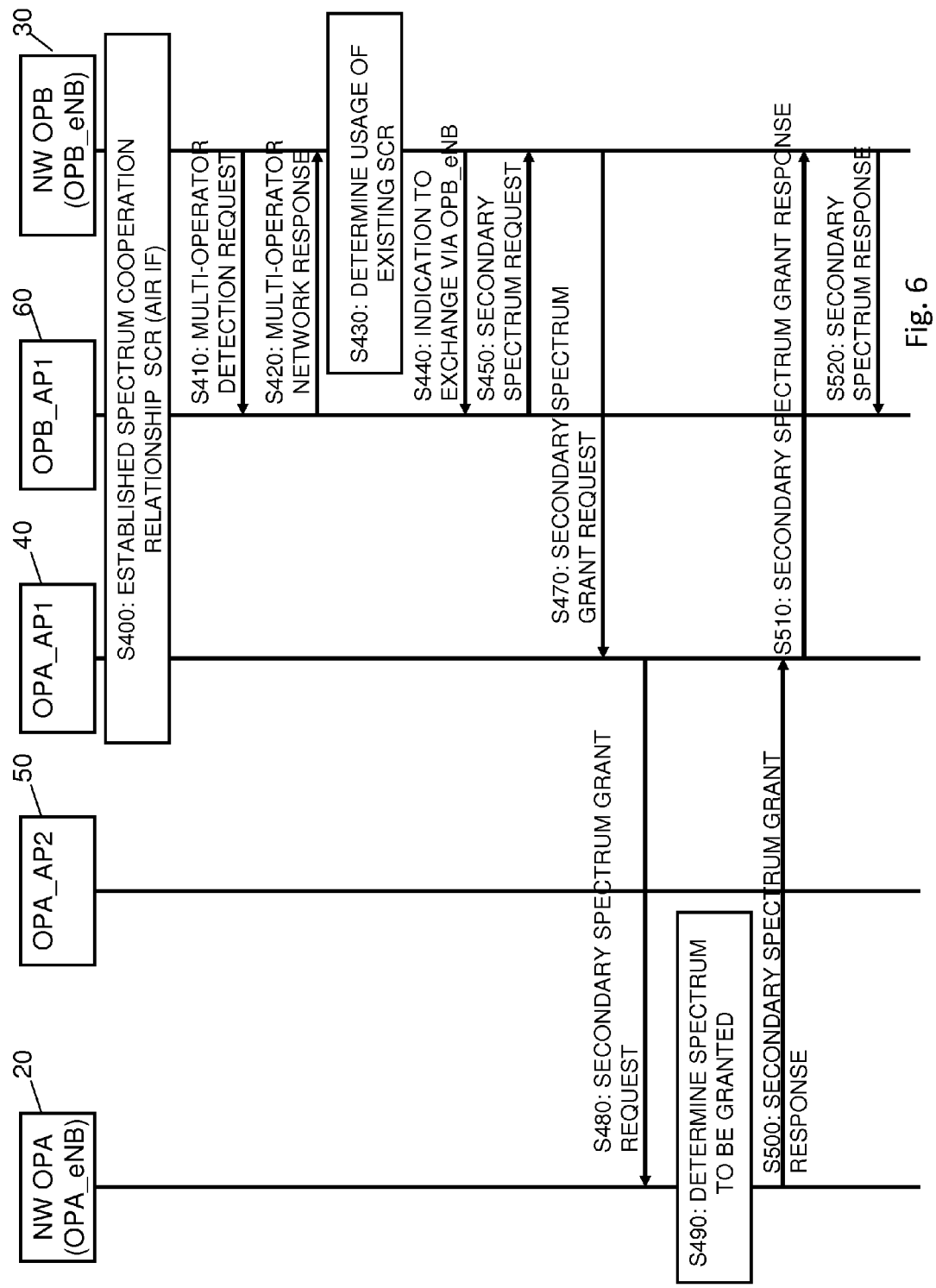
FIG. 6 shows a signaling diagram illustrating a communication control using a spectrum cooperation relationship according to some examples of embodiments.
Figure 7:
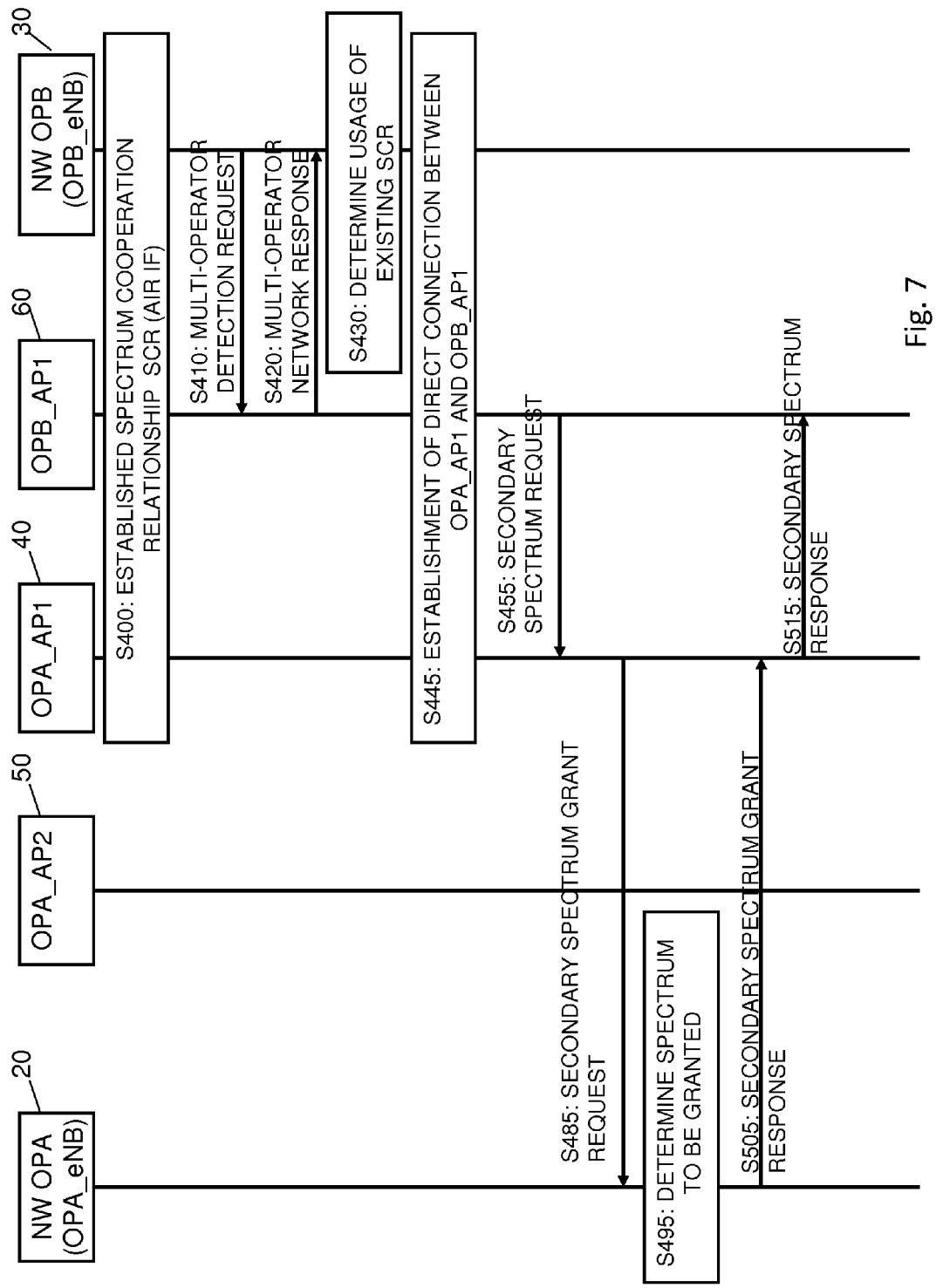
FIG. 7 shows a signaling diagram illustrating a communication control using a spectrum cooperation relationship according to some examples of embodiments.

FIG. 6 and FIG. 7 relate to alternative examples of the examples of embodiments according to FIGS. 4 and 5. Also in the examples of FIGS. 6 and 7, a spectrum cooperation relationship is established for one small cell, but in this case the small cell having the SCR is originally located in the other operator's network. In other words, while the small cells having SCR are part of OPA network, a small cell AP of OPB (e.g. OPB_AP1 60) wishes to set up a spectrum cooperation relationship for sharing the spectrum of OPA, wherein the OPB_eNB30 or the OPB_O&M 30a control the small cell in question (i.e. OPB_AP1 60), and OPB_eNB 30 has established the communication connection to OPA_AP1 40. Depending on the way for exchanging secondary spectrum usage related messages, the requirements for reachability of one cell by another cell are flexible. For example, in the case described in connection with FIG. 6, the small cell having SCR (OPA_AP1 40) is not necessarily reachable by the small cell for which secondary spectrum usage is requested (e.g. OPB_AP1 60). It is only necessary that the small cell having SCR (OPA_AP1 40) has an established communication connection with the communication network control element of OPB network (OPB_eNB 30) which controls the small cell requesting secondary spectrum usage (i.e. OPB_AP1 60), wherein of course the small cell requesting secondary spectrum usage has to be able to reach the OBA network from which spectrum is requested (i.e. OPB_AP1 60 is under the coverage of OPA_eNB 20 which controls the small cell OPA_AP1 40). On the other hand, in a case as indicated in FIG. 7, where a direct communication between APs is established (as described below), the respective small cells are to be reachable by each other.

Referring to FIG. 6, in S400, it is assumed that a spectrum cooperation relationship is established between at least one access network element of a small cell of OPA network (e.g. OPA_AP1 40) and a serving cell of the OPB network. In other words, a communication connection path or air interface between the networks for secondary spectrum usage coordination is already established. For example, this is done in accordance with the processing described in connection with FIG. 2, but also other spectrum coordination opportunities are usable.

When a small cell of the OPB network (e.g. OPB_AP1 60) is allowed or instructed to set up a sharing spectrum cooperation relationship with another network (e.g. the OPA network), the small cell AP (OPB_AP1 60) executes a detection of the other network, i.e. of OPA network, preferably of the macro network or cell 200 of OPA. For this purpose, for example, system information provided by the OPA network (in form of broadcasting messages) are detected and processed.

The detection may be started by the OPB_AP1 60 itself, e.g. as a SON feature, or a request to start a multi-operator detection is sent from the OPB network (e.g. the OPB_eNB 30 or the OPB_O&M 30a) in S410.

According to some examples, in order to facilitate the detection conducted by the small cell OPB_AP1 60, the OPB_AP1 60 may be (pre-)configured with OPA's network related information, such as RF channels and PLMN identifiers thereof. Furthermore, according to some examples, also information regarding IDs of small cells having already an established spectrum cooperation relationship, i.e. a communication connection path (air interface) established to the OPB network (e.g. OPA_AP1 40) is provided. The configuration information is provided e.g. by the request message in S410 or by a separate signaling (not shown). Based on the information, the OPB_AP1 60 then searches the OPB's network and the other small cells with established SCR.

When the detection is finished, in S420, OPB_AP1 60 reports the detection result of OPA's network (and possibly of the small cells with established SCR) to the OPB network (e.g. the OPB_eNB 30 or the OPB_O&M 30a), for example as a response to the message in S410 or as a separate message. The report comprises, for example, cell identifiers (e.g. EGCI), downlink measurements (e.g. RSRP and/or RSRQ) etc. with regard to the OPA network (and the small cells with SCR). Furthermore, for example, in case more than one cell (macro cells and/or small cells) from the multiple operators' network (OPA network) are detected, the OPB_AP1 60 may relate the report sent in S420 to the strongest cell from each operator's network, or to all the detected cells from all the relevant operators.

On the basis of the received report, the OPB network (i.e. OPB_eNB 30 or OPB_O&M 30a), may determine in S430 to utilize the available spectrum cooperation opportunity for OPB_AP1 60 without establishment of a separate SCR for OPB_AP1 60 with OPA network. That is, it is decided in S430 that at least some of the small cells of OPB for which a secondary spectrum usage is desired may use the already established SCR to communicate with the other operator's (OPA) network for spectrum coordination.

The determination in S430 may be based on different parameters.

For example, the general availability of small cells that have an established SCR with other operator's network is checked. In the present example, the small cell having the established SCR may be from another operator network (OPA network) where a controlling eNB (OPB_eNB 30) of the small cell in question (OPB_AP1 60) has established a communication connection path (air interface) for spectrum cooperation relationship purposes with the small cell with SCR (OPA_AP1 40).

Furthermore, the determination in S430 may be also based on an available capacity of the established SCR or on a determination of how many small cell APs can utilize the SCR for delivery of secondary spectrum usage request procedure related messages or how often the established SCR can be used for secondary spectrum usage request.

It is to be noted that the determination in S430 may be based on other information than that provided in S420, depending on the kind of spectrum cooperation opportunity and the setting thereof.

According to some examples, there may be executed two determination processes in the OPB_eNB 30. One is to determine if there is any existing SCR which can be used when an SCR is decided to be setup for an AP. The other one is to determine if there is any granted secondary spectrum that can be used when a secondary spectrum usage is requested by another AP.

In the example according to FIG. 6, after the usage of the existing SCR is determined in S430, the OPB network (e.g. controlling OPB_eNB 30 or OPB_O&M 30a) may, based on the determination of available spectrum cooperation opportunity, inform in S440 the small cell AP in question (i.e. OPB_AP1 60), e.g. in the form of control information, that any signaling related to a secondary spectrum usage request procedure is to be forwarded to the controlling OPB_eNB 30, i.e. to be exchanged with other operator's network (OPA network) via OPB_eNB 30. Consequently, the OPB_AP1 60 prepares a corresponding signaling path for a secondary spectrum usage request towards the OPB_eNB 30.

Next, a coordination procedure of a secondary spectrum usage by the OPB_AP1 60 based on the information in S440 and by using the prepared signaling path is conducted on the basis of the established spectrum cooperation relationship.

Specifically, in S450, OPB_AP1 60 requests a secondary spectrum usage with regard to a spectrum of OPA. A trigger of the request may be in accordance with that described in connection with FIG. 3 at S80 or S85.

The request may comprise, for example, information regarding IDs of PLMNs, primary spectrum usage information, etc.

In S470, the OPB_eNB 30 uses the established communication connection path (air interface) to the small cell AP with the SCR (OPA_AP1 40). The secondary spectrum grant request messages may comprise, for example, information about a secondary spectrum sensing result, an identification of detected small cells of OPA, and an information indicating the ID of the small cell requesting the secondary spectrum usage (i.e. of OPB_AP1 60). In S480, the secondary spectrum grant request is forwarded form OPA_AP1 40 to the OPA (i.e. OPA_eNB 20).

At the OPA side, as in case of the processing in FIG. 3, the secondary spectrum grant request is processed in S490 so as to determine the spectrum to be granted. Then, in S500, a secondary spectrum grant response message is sent back to the OPB via the communication connection path between the OPA_AP1 40 and the OPB_eNB 30 (see S510). The secondary spectrum grant response message indicates the granted spectrum information, usage conditions and also the ID of OPB_AP1 60 for which the spectrum is granted. The OPA_AP1 40 forwards the secondary spectrum grant response message in S510 to the controlling OPB_eNB 30.

In S520, the OPB_eNB 30 informs the requesting small cell AP (OPB_AP1 60) about the grant of the secondary spectrum usage by sending a response to the secondary spectrum request of S450 including the granted spectrum information and the usage conditions.

FIG. 7 illustrates an alternative to the processing of FIG. 6 beginning after S430. That is, the processing described in connection with FIG. 6 regarding S400 to S430 is equivalent to the processing for S400 to S430 in FIG. 7, so that a repetition of the description thereof is omitted here.

According to the examples related to the processing according to FIG. 7, in order to further enhance a spectrum usage related message exchange, the small cell AP in question (i.e. OPB_AP1 60) may be configured to detect the relevant small cells with established SCR (e.g. OPA_AP1 40) and report the detected small cells with established SCR to its controlling OPB_eNB 30 with the message in S430 or by separate message. Based on the reporting, e.g. when the OPB_AP1 60 reports the detection of the OPA_AP1 40, the controlling OPB_eNB 30 may initiate or coordinate an establishment of a bi-directional direct connection (e.g. an over-the-air link) between the two small cell APs (i.e. OPA_AP1 40 and OPB_AP1 60) in S445. Thus, the small cell AP in question (OPB_AP1 60) is able to directly communicate with the small cell with SCR (OPA_AP1 40) in case a spectrum usage related message exchange is required (e.g. when a secondary spectrum request is to be made). For example, the direct connection can be established in that the OPB_AP1 60 accesses to OPA_AP1 40 (the small cell with SCR) as a UE for over-the-air communication.

Consequently, the OPB_AP1 60 prepares a corresponding signaling path for a secondary spectrum usage request towards the OPA_AP1 40.

Next, a coordination procedure of a secondary spectrum usage by the OPB_AP1 60 based on the direct connection established in S445 (i.e. by using the prepared signaling path) is conducted.

Specifically, in S455 OPB_AP1 60 requests via the established direct connection path (air interface) to OPA_AP1 40 a secondary spectrum usage with regard to a spectrum of OPA. A trigger of the request may be in accordance with that described in connection with FIG. 3 at S80 or S85.

The request may comprise, for example, information regarding a secondary spectrum sensing result (if conducted by the OPB_AP1 60), and information about IDs of small cells of the OPA network.

In S485, OPA_AP1 40 sends the secondary spectrum request to the OPA network (i.e. OPA_eNB 20). The secondary spectrum grant request messages may comprise, for example, information about a secondary spectrum sensing result, an identification of detected small cells of OPB, and an information indicating the ID of the small cell requesting the secondary spectrum usage (i.e. of OPB_AP1 60).

At the OPA side, as in case of the processing in FIG. 3, the secondary spectrum grant request is processed in S495 so as to determine the spectrum to be granted. Then, in S505, a secondary spectrum grant response message is sent back to the OPB via OPA_AP1 40, wherein the secondary spectrum grant response message indicates the granted spectrum information, usage conditions and also the ID of OPB_AP1 60 for which the spectrum is granted.

In S515, the OPA_AP1 40 informs the requesting small cell AP (OPB_AP1 60) about the grant of the secondary spectrum usage by sending a response to the secondary spectrum request of S455 including the granted spectrum information and the usage conditions.

Referring to FIG. 1, which illustrates an example deployment of two operators' heterogeneous networks, the following describes examples of possible spectrum cooperation relationships. It is to be noted that the following description is not complete, and other constellations are possible. OPA_AP1 40 has an established SCR to OPB. As OPA_AP1 40 and OPA_AP2 50 are under the control of the same eNB (i.e. OPA_eNB 20) and they are under the coverage of the same cell of OPB (i.e. OPB_eNB 30), OPA_AP1 40 is the small cell AP having SCR to be considered by OPA_AP2 50. On the other hand, as OPB_AP1 60 is under the control of OPB_eNB 30 which is the SCR serving eNB of OPA_AP1 40, and OPB_AP1 60 is further under the coverage of OPA_eNB 20 which is the controlling eNB of the OPA_AP1 40, OPAC_AP1 is also the small cell AP having SCR to be considered by OPB_AP1 60. Therefore, the established SCR may be used by both OPA_AP2 50 and OPB_AP1 60 for secondary spectrum coordination with OPB and OPA, respectively.

Figure 8:
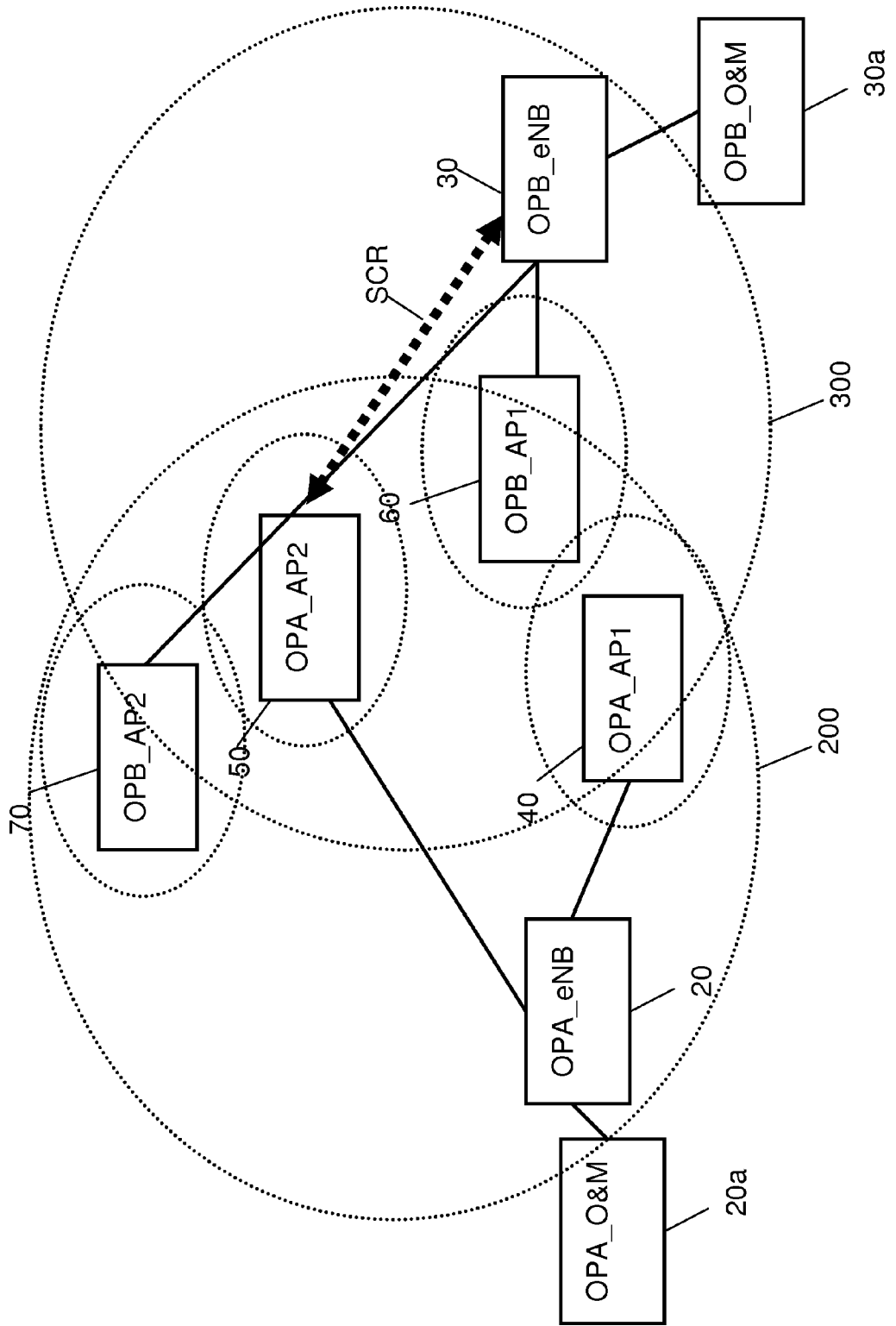
FIG. 8 shows a diagram illustrating a communication network configuration where some examples of embodiments are implemented.

It is to be noted that, in a dense deployment scenario of APs, for example in urban areas or a shopping mall, limiting factors are relations between APs and eNBs and the actual spectrum available to be shared. FIG. 8, which illustrates an example deployment of two operators' heterogeneous networks similar to that of FIG. 1, but with one additional small cell of POPB (i.e. OPB_AP2 70), is used to illustrate further effects of the described examples. Specifically, with regard to FIG. 8, it is explained that sharing spectrum coordination relationship between APs and eNBs may or may not be linked to spectrum sharing.

In the example illustrated in FIG. 8, for example, OPA_AP1 40 and OPB_AP1 60 can share the SCR established between OPA_AP2 50 and OPB (OPB_eNB 30), which is indicated by the dashed arrow. However, but they do not share a spectrum with OPA_AP2 50. On the other hand, OPB_AP2 70 may share both the SCR and the spectrum with OPA_AP2 50.

According to further examples, a centralized data base control may be provided. The centralized database control may be geo-location dependent. For example, the centralized database control may be separate for small cell APs in the area near one specific point, e.g. small cells near OPA_AP2 and small cells near OPA_AP1, when referring to FIG. 8, for example. However, the relation between OPA_AP2 and OPB can be used by the APs in both areas. The role of AP-eNB sharing relations is providing the opportunity for a specific AP or group of APs to coordinate the spectrum usage with other operator's network.

Figure 9:
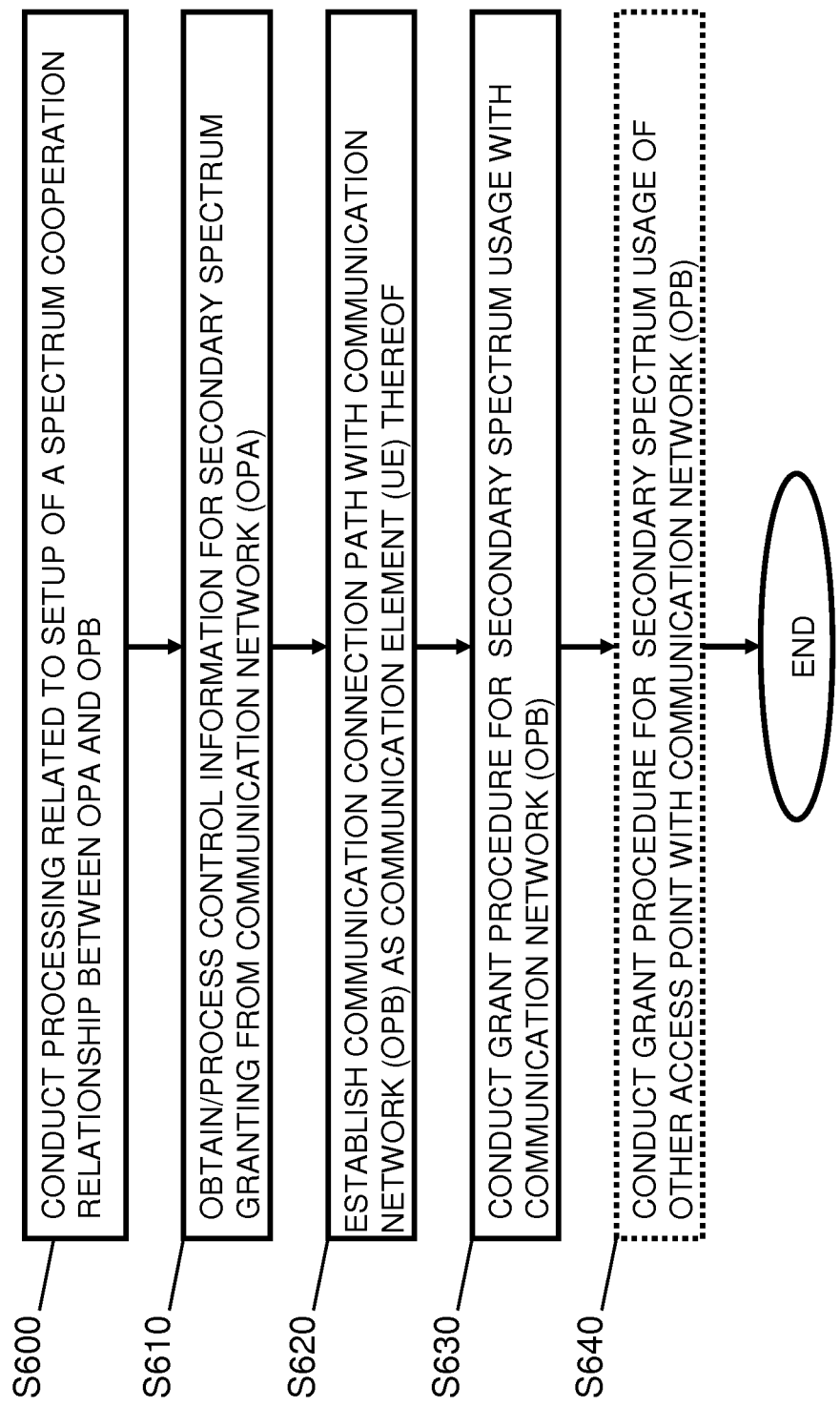
FIG. 9 shows a flow chart of a processing conducted in an access network element (AP) with regard to a communication control using a spectrum cooperation relationship according to some examples of embodiments.

FIG. 9 shows a flow chart of a processing conducted in an access network element (e.g. OPA_AP1 40) with regard to a communication control using a spectrum cooperation relationship according to some examples of embodiments.

In S600, a processing is conducted being related to set up a spectrum cooperation relationship in which a spectrum used for communication by a second communication network is allowed to be shared by at least one access network element of a first communication network. According to some examples, the processing related to set up the spectrum cooperation relationship further comprises detecting communications of cells belonging to the second communication network, and reporting results of the detection of communications of the cells to the first communication network. According to examples, the detection of communications of cells belonging to the second communication network may be initiated by a request from the first communication network. Furthermore, the detection of communications of cells belonging to the second communication network may be based on pre-configured information providing information about the communications of the cells belonging to the second communication network.

In S610, control information indicating an establishment of a spectrum cooperation relationship between the first communication network and the second communication network is received and processed. The control information may comprise at least one of information indicating a cell of the second communication network to be used as a serving cell, and context information related to the establishment of a communication connection by a communication element of the second network.

In S620, on the basis of the control information, a communication connection path to the second communication network is established wherein the at least one access network element of the first communication network acts as a communication element (UE) of the second communication network. The establishment of the communication connection path to the second communication network may comprise to conduct an access procedure via an access channel to the second network in accordance with an access procedure used by a communication element.

In S630, a processing related to the grant of a secondary spectrum usage is executed. Specifically, a grant of a secondary spectrum usage on the basis of the established spectrum cooperation relationship from the second communication network is requested, wherein a grant request message is transmitted via the established communication connection path. A response to the grant request message is received from the second communication network and processed, wherein the response may comprise information related to a spectrum of the second communication network granted for a secondary spectrum usage and information related to usage conditions. Furthermore, the request for the grant of the secondary spectrum usage may be triggered by a command received from the first communication network, or by an internal trigger processing based on conditions and rules related a request for a grant of a secondary spectrum usage.

In addition, in connection with the secondary spectrum usage request, communication conditions such as a signal strength value and an interference power value related to communications of cells belonging to the second communication network may be detected, wherein the grant request message may further comprise information related to results of the detection of the communication condition.

In connection with the request of a secondary spectrum usage, it may be determined whether a communication with the second communication network is possible, e.g. when serving a connected UE. If not, a communication operation with the connected UE may be interrupted, or a connected UE may be instructed to communicate with the second communication network for transmitting the grant request message.

Furthermore, an update message may be received and processed which indicates an update of information comprised in the response to the grant request message (i.e. granted spectrum and usage conditions).

Optionally, the processing comprises S640 wherein a request for a grant of a secondary spectrum usage on the basis of the established spectrum cooperation relationship for another access network element is received and processed. A corresponding grant response message for the request for the grant of the secondary spectrum usage for the other access network element is also transmitted. For example, the request for the grant of the secondary spectrum usage for the other access network element is received from the first communication network, or a direct connection to the other access network element is established for exchanging messages related to the secondary spectrum usage by the other access network element, wherein then the request for the grant of the secondary spectrum usage for the other access network element may be received via the direct connection.

Moreover, in connection with S640, the processing of the request for the grant of the secondary spectrum usage for the other access network element comprises to determine whether the request is to be forwarded to the first or second communication network for granting of the secondary spectrum usage for the other access network element. In the case that the determination is negative, the processing may comprise a coordination of a usage of a previously granted secondary spectrum usage with the other access network element, and a preparation of the grant response message for the request for the grant of the secondary spectrum usage for the other access network element on the basis of the coordination. Otherwise, in the case that the determination is positive, the processing may comprise a transmission of the request to the first or second communication network, wherein an indication of the other access network element may be included to the request, wherein a grant response message from the first or second communication network is received and process, wherein the grant response message for the request for the grant of the secondary spectrum usage for the other access network element is prepared on the basis of the received grant response message from the first or second communication network. The transmission of the request to the first communication network is conducted by using an interface between a communication network control element of the first network and an access network element controlled thereby, or the transmission of the request to the second communication network is conducted by using the established communication connection path.

Figure 10:
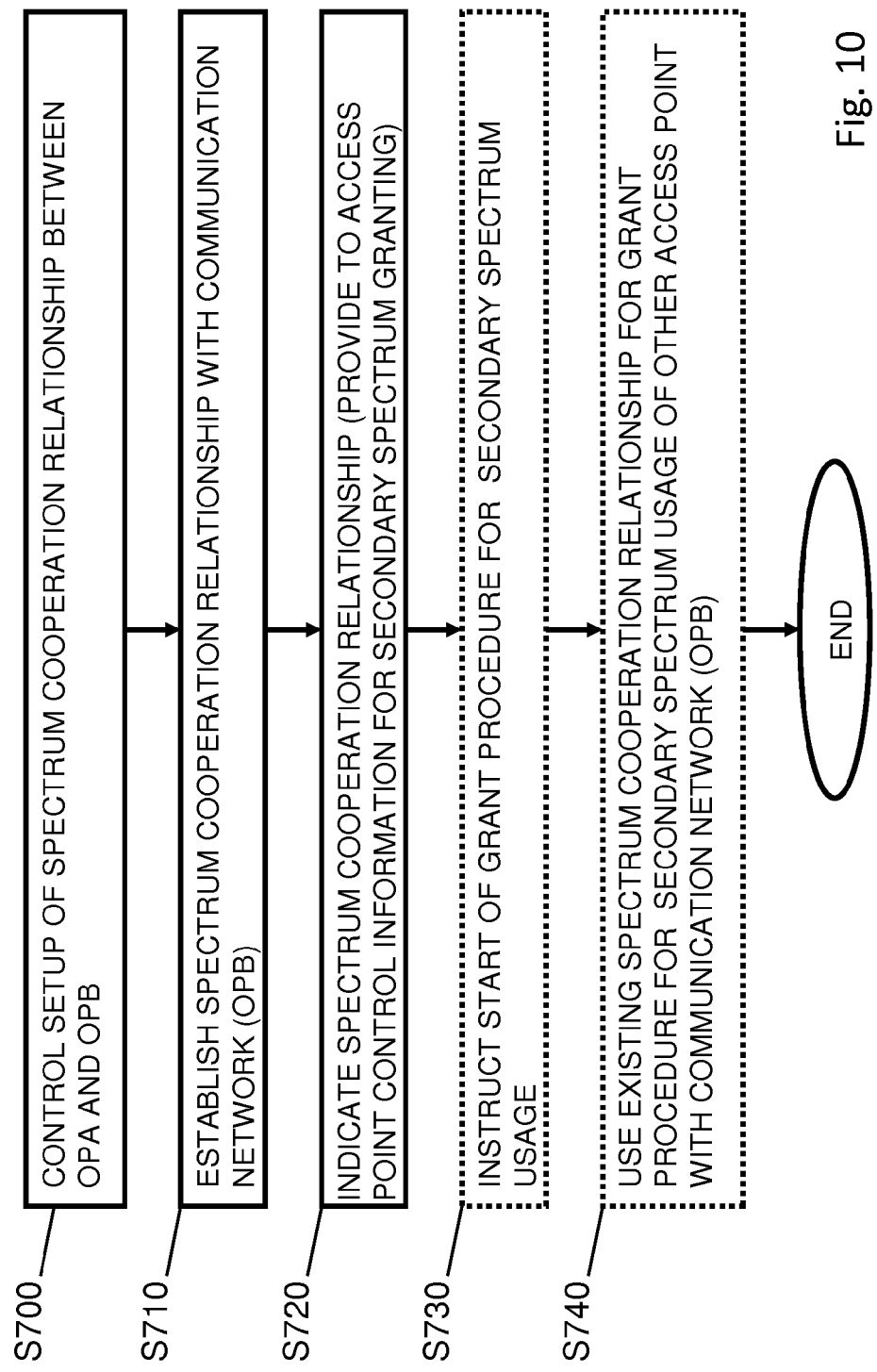
FIG. 10 shows a flow chart of a processing conducted in a communication network control element with regard to a communication control using a spectrum cooperation relationship according to some examples of embodiments.

FIG. 10 shows a flow chart of a processing conducted in a communication network control element (e.g. OPA_eNB 20) with regard to a communication control using a spectrum cooperation relationship according to some examples of embodiments.

In S700, a processing related to set up a spectrum cooperation relationship is controlled in which a spectrum used for communication by a second communication network is allowed to be shared by at least one access network element of a first communication network. According to some examples, the processing related to set up the spectrum cooperation relationship further comprises receiving a report indicating a detection of communications of cells belonging to the second communication network, and processing the report. The at least one access network element may be requested to detect the communications of cells belonging to the second communication network. Furthermore, information about the communications of the cells belonging to the second communication network for pre-configuring the detection of communications of cells belonging to the second communication network may be transmitted/provided. The processing related to set up the spectrum cooperation relationship may further comprise to select a target cell of the second communication network as a serving cell for the spectrum cooperation relationship.

In S710, a spectrum cooperation relationship is established between the first communication network and the second communication network. The establishment of the spectrum cooperation relationship between the first communication network and the second communication network may comprise a transmission of a spectrum cooperation relationship establishment request to the second communication network, and a receipt of a response to the spectrum cooperation relationship establishment request, which is processed. The spectrum cooperation relationship establishment request may comprise at least one of an identification of cells of the second communication network usable as serving cells for establishing a communication connection path with the at least one access network element, and an identification of the at least one access network element and information related to a capability of the at least one access network element for acting as a communication element. The response to the spectrum cooperation relationship establishment request may comprise at least one of information indicating a cell of the second communication network to be used as a serving cell, and context information related to the establishment of a communication connection by a communication element of the second network.

In step S720, control information is transmitted to at least one access network element of the first communication network, the control information indicating the establishment of the spectrum cooperation relationship between the first communication network and the second communication network. The control information may comprise at least one of information indicating a cell of the second communication network to be used as a serving cell, and context information related to the establishment of a communication connection by a communication element of the second network.

In S730, which is optionally executed, a command is transmitted to the at least one access network element to request a grant of a secondary spectrum usage on the basis of the established spectrum cooperation relationship from the second communication network.

In S740, which is also optional, a processing related to a secondary spectrum usage is conducted where an existing spectrum cooperation relationship of one small cell AP is used for another small cell AP. That is, an existence of at least one of an established spectrum cooperation relationship and a grant of a secondary spectrum usage for at least one access network element on the basis of the established spectrum cooperation relationship between the first communication network and the second communication network is detected. Furthermore, a capacity of the established spectrum cooperation relationship between the first communication network and the second communication network may be detected.

In the processing of S740, when the existence of spectrum cooperation relationship between the first communication network and the second communication network for at least one access network element is determined, the control information being transmitted in S720 may comprise an indication that messages related to a secondary spectrum usage of the spectrum of the second communication network are to be forwarded to a communication network control element of the first communication network. Then, a request for a grant of a secondary spectrum usage of the spectrum of the second communication network may be received and processed, and a grant response message for the request for the grant of the secondary spectrum usage may be transmitted. The processing of the request for the grant of the secondary spectrum usage may comprise a determination whether the request is to be forwarded to the second communication network for granting of the secondary spectrum usage. In the case that the determination is negative, the processing may comprise a coordination of a usage of a previously granted secondary spectrum usage between access network elements, and a preparation preparing the grant response message for the request for the grant of the secondary spectrum usage on the basis of the coordination. On the other hand, in the case that the determination is positive, the processing may comprise a transmission of the request to the second communication network, wherein an indication of another access network element is included to the request, a reception of a grant response message being sent from the second communication network, and a preparation of the grant response message for the request for the grant of the secondary spectrum usage on the basis of the received grant response message being sent from the second communication network. Here, the transmission of the request to the second communication network is conducted by using a communication connection path between the second communication network and an access network element for which a secondary spectrum usage is granted.

Furthermore, when the existence of at least one of an established spectrum cooperation relationship and a grant of a secondary spectrum usage for at least one access network element is determined, an establishment of a direct connection between an access network element for which a secondary spectrum usage is granted and another access network element is established for exchanging messages related to a secondary spectrum usage by the other access network element.

Figure 11:
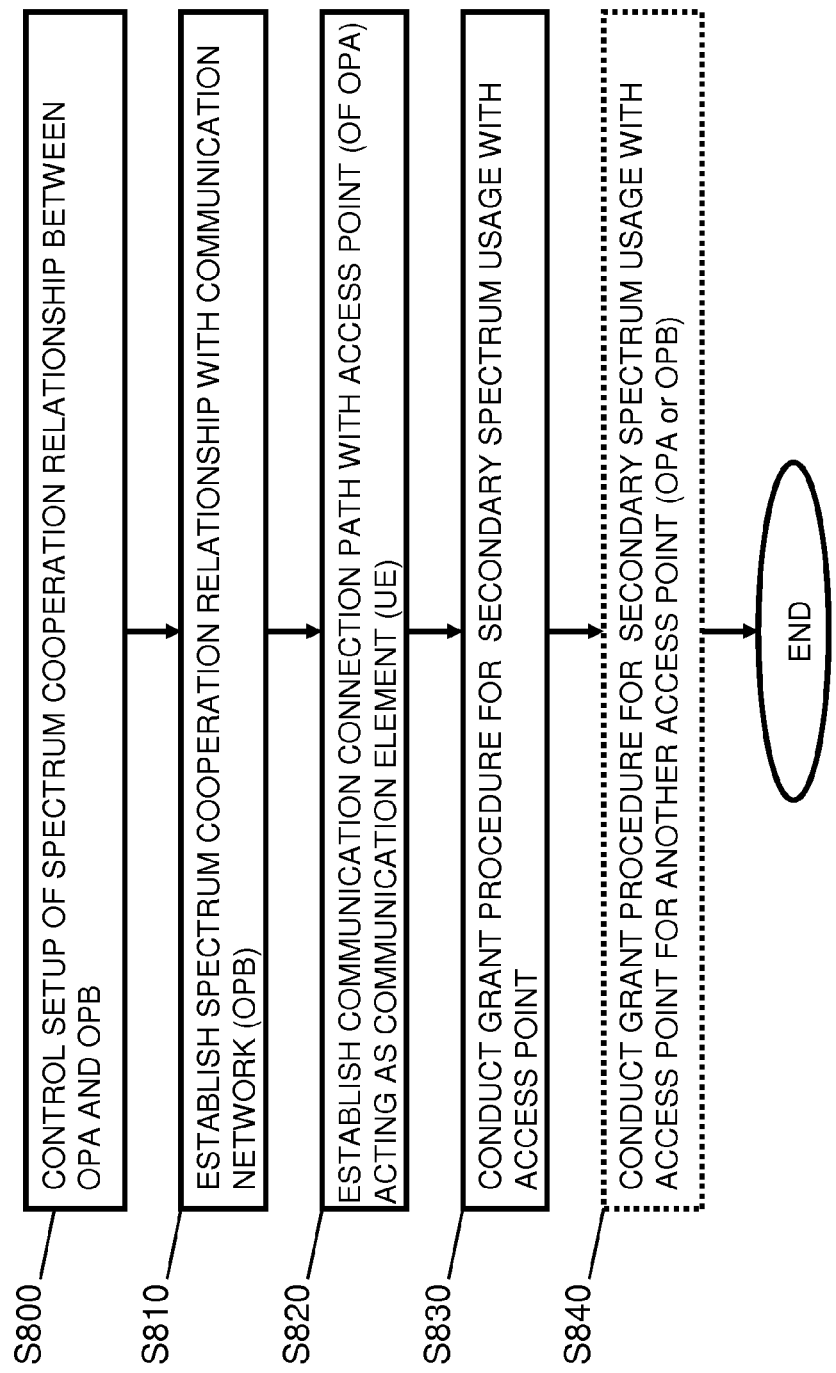
FIG. 11 shows a flow chart of a processing conducted in a communication network control element with regard to a communication control using a spectrum cooperation relationship according to some examples of embodiments.

FIG. 11 shows a flow chart of a processing conducted in a communication network control element (e.g. OPB_eNB 30) with regard to a communication control using a spectrum cooperation relationship according to some examples of embodiments.

In S800, a processing related to set up a spectrum cooperation relationship is controlled in which a spectrum used for communication by a second communication network being the own communication network is allowed to be shared by at least one access network element of a first communication network being another communication network.

In S810, a spectrum cooperation relationship between the first communication network and the second communication network is established. The establishment of the spectrum cooperation relationship between the first communication network and the second communication network may comprise a reception and processing of a spectrum cooperation relationship establishment request, and a transmission of a response to the spectrum cooperation relationship establishment request. The spectrum cooperation relationship establishment request may comprise at least one of an identification of cells of the second communication network usable as serving cells for establishing a communication connection path with the at least one access network element, and an identification of the at least one access network element and information related to a capability of the at least one access network element for acting as a communication element. Furthermore, the processing of the spectrum cooperation relationship establishment request may comprise a determination of a cell to be used as a serving cell for a request for grant of a secondary spectrum usage, and a determination of context information related to an establishment of a communication connection by a communication element, wherein the response to the spectrum cooperation relationship establishment request comprises at least one of information indicating the cell of the second communication network to be used as the serving cell, and the context information related to the establishment of a communication connection by a communication element.

In S820, a communication connection path to at least one access network element of the first communication network is established, wherein the at least one access network element of the first communication network acts as a communication element of the second communication network. The establishment of a communication connection path to the at least one access network element of the first communication network may comprise an access procedure via an access channel of the second network in accordance with an access procedure used by a communication element.

In S830, a secondary spectrum usage granting procedure is executed. A grant request message requesting a grant of a secondary spectrum usage on the basis of the established spectrum cooperation relationship is received and processed, wherein the grant request message is received via the established communication connection path. Furthermore, a response to the grant request message is transmitted via the established communication connection path, the response comprising information related to a spectrum of the second communication network granted for a secondary spectrum usage and information related to usage conditions. According to examples, the grant request message may further comprise information related to a detection of communication condition including at least one of a signal strength value and an interference power value related to communications of cells belonging to the second communication network.

In connection with the secondary spectrum usage granting procedure, a measurement of interferences in the second communication network caused by communications of the at least one access network element of the first communication network using the spectrum of the second communication network granted for a secondary spectrum usage is initiated, wherein a result of the measurements of interferences is processed, a decision is made on the basis of the results of measurements whether an update of grant of the secondary spectrum usage is necessary, and update information is transmitted for modifying the information comprised in the response to the grant request message via the established communication connection path, the update information being related to a modified spectrum of the second communication network granted for a secondary spectrum usage and information related to modified usage conditions. The initiation of a measurement of interferences may comprise to request at least one access network element or a communication network control element of the second communication network to conduct the measurement of interferences on the basis of an indication of the at least one access network element of the first communication network using the spectrum of the second communication network granted for a secondary spectrum usage, to receive results of the measurements conducted by the at least one access network element of the second communication network, and to process the results of the measurements.

In S840, which is optional, a secondary spectrum usage granting procedure is executed for an AP having no established spectrum cooperation relationship. In this context, via the established communication connection path, a request for a grant of a secondary spectrum usage on the basis of the established spectrum cooperation relationship for another access network element being different to that to which the communication connection path is established is received. The received request is processed, and a grant response message for the request for the grant of the secondary spectrum usage for the other access network element is transmitted.

Figure 12:
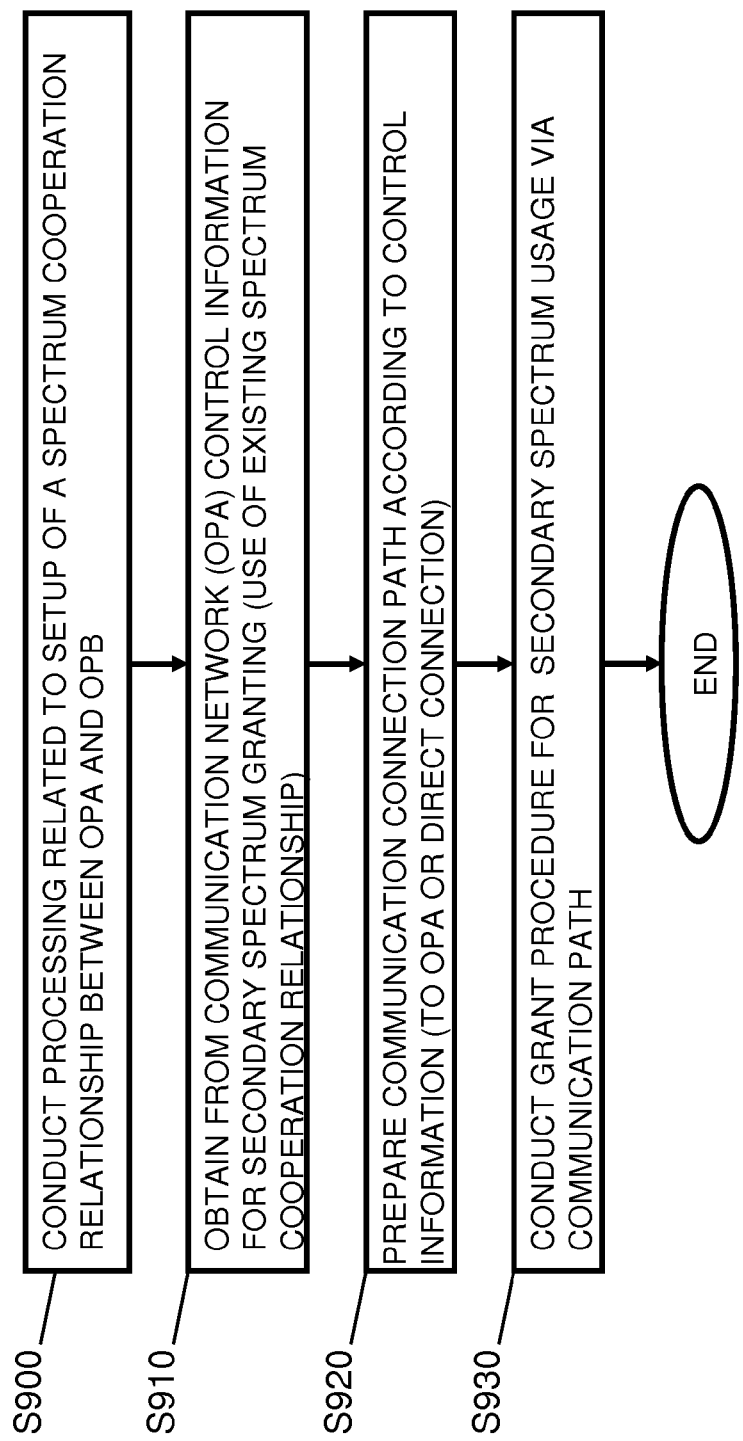
FIG. 12 shows a flow chart of a processing conducted in an access network element (AP) with regard to a communication control using a spectrum cooperation relationship according to some examples of embodiments.

FIG. 12 shows a flow chart of a processing conducted in an access network element (OPA_AP2 50 or OPB_AP1 60) with regard to a communication control using a spectrum cooperation relationship according to some examples of embodiments.

In S900, a processing related to set up a spectrum cooperation relationship is conducted in which a spectrum used for communication by a second communication network is allowed to be shared by at least one access network element of a first communication network. The processing related to set up the spectrum cooperation relationship may further comprise a detection of communications of at least one of cells belonging to the second communication network and of access network elements of the first communication network having an established spectrum cooperation relationship (e.g. a spectrum cooperation relationship established as described in connection with FIG. 2, any kind spectrum coordination being available for at least one access network element and at least one other access point utilizing this spectrum coordination in a cooperative manner, where already a secondary spectrum usage of a spectrum of the second communication network is granted, etc., and a provision of a report concerning results of the detection of communications of the cells and the access network elements of the first communication network having an established spectrum cooperation relationship for a spectrum of the second communication network with the first communication network. The detection of communications of cells belonging to the second communication network and of access network elements of the first communication network having a spectrum cooperation relationship for a spectrum of the second communication network may be initiated by a request from the first communication network. Furthermore, the detection of communications of at least one of cells belonging to the second communication network and of access network elements of the first communication network having a spectrum cooperation relationship for a spectrum of the second communication network may be based on preconfigured information providing information about the communications of the cells belonging to the second communication network and of the access network elements of the first communication network having a spectrum cooperation relationship for a spectrum of the second communication network.

It is to be noted that according to some examples of embodiments, the detection process in S900 is for detecting (small) cells of other APs with SCR so that the controlling communication network control element (e.g. eNB) is able to determine, on the basis of the detection report from AP in question, to setup a direct connection, e.g. an over-the-air link between the AP in question and the other APs with SCR.

In S910, control information indicating an existence of an established spectrum cooperation relationship between the first communication network and the second communication network is received and processed. The control information may comprise an indication that messages related to a secondary spectrum usage of the spectrum of the second communication network are to be forwarded to a communication network control element of the first communication network, wherein the communication connection path for requesting a secondary spectrum usage is prepared towards the communication network control element of the first communication network.

In S920, on the basis of the control information, a communication connection path for requesting a secondary spectrum usage is prepared. This communication connection path may be a connection to a communication network control element or to an access point having an established SCR.

In S930, a secondary spectrum usage granting procedure is executed. For this, a request for a grant of a secondary spectrum usage of the spectrum of the second communication network is transmitted via the prepared communication connection path towards the communication network control element of the first communication network or the access point having the SCR, and a grant response message for the request for the grant of the secondary spectrum usage is received via the prepared communication connection path towards the communication network control element of the first communication network or the access point having the SCR, wherein grant response message is also processed.

It is to be noted that according to examples, the connection to the access point having the SCR is based on the establishment of a direct connection to an access network element for which a secondary spectrum usage is granted for exchanging messages related to the secondary spectrum usage.

Furthermore, the grant response message may comprise information related to a spectrum of the second communication network granted for a secondary spectrum usage and information related to usage conditions.

Figure 13:
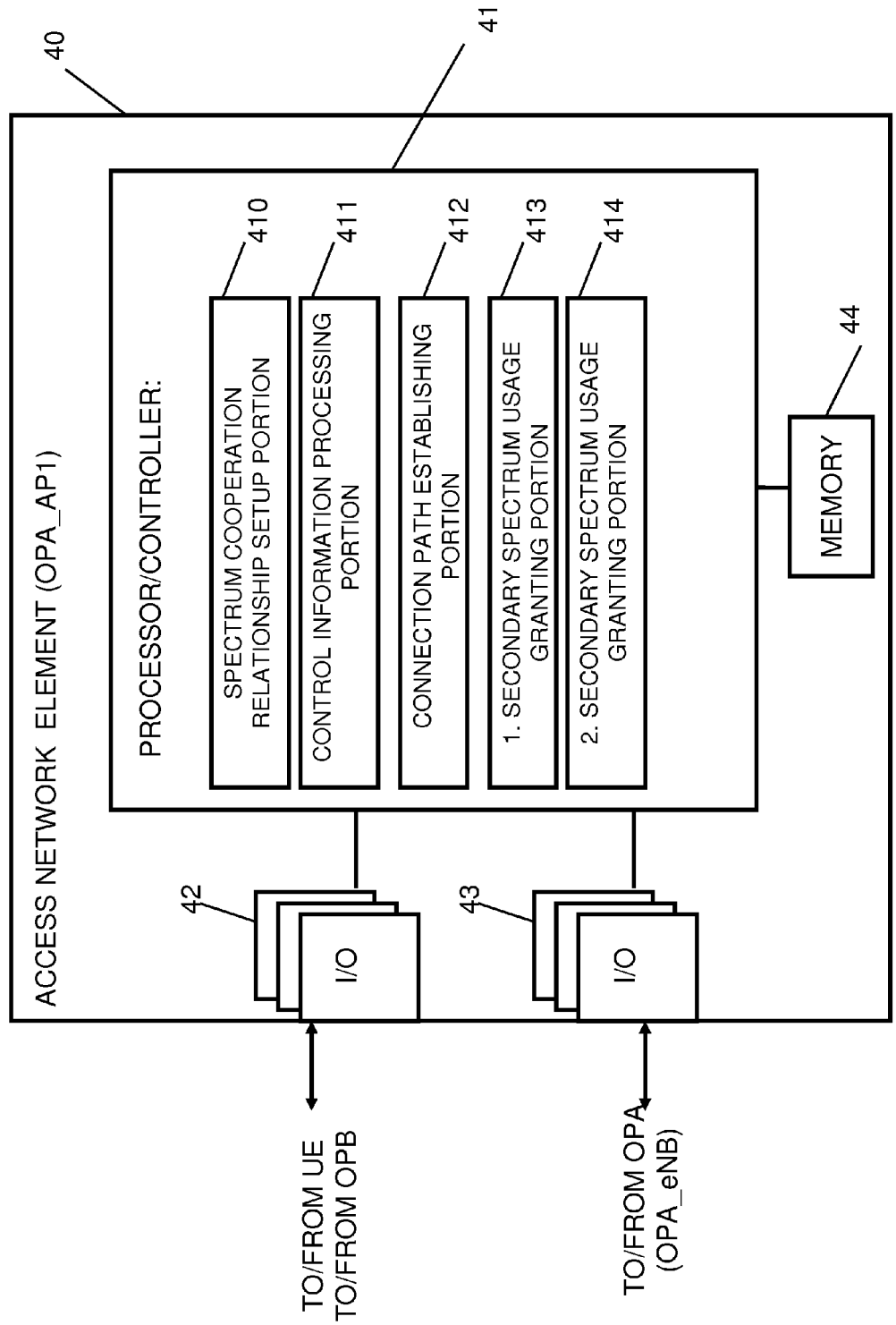
FIG. 13 shows a diagram of an access network element including processing portions conducting functions according to some examples of embodiments.

In FIG. 13, a diagram illustrating a configuration of an access network element, such as of the OPA_AP1 40, is shown, which is configured to implement the communication procedure as described in connection with some of the examples of embodiments. It is to be noted that the access network element like the OPA_AP1 40 shown in FIG. 13 may comprise further elements or functions besides those described herein below. Furthermore, even though reference is made to an AP, the access network element may be also another device having a similar function, such as a chipset, a chip, a module etc., which can also be part of an AP or attached as a separate element to an AP, or the like. It should be understood that each block and any combination thereof may be implemented by various means or their combinations, such as hardware, software, firmware, one or more processors and/or circuitry.

The access network element shown in FIG. 13 may comprise a processing function, control unit or processor 41, such as a CPU or the like, which is suitable for executing instructions given by programs or the like related to the communication procedure. The processor 41 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference signs 42 and 43 denote transceiver or input/output (I/O) units (interfaces) connected to the processor 41. The I/O units 42 may be used for communicating with one or more communication elements like UEs and with a communication network control element like an eNB of another network (e.g. OPB_eNB 30). The I/O units 43 may be used for communicating with an own communication network, e.g. with a controlling eNB (OPA_eNB 20), and the core network. The I/O units 42 and 43 may be a combined unit comprising communication equipment towards several network elements, or may comprise a distributed structure with a plurality of different interfaces for different network elements. Reference sign 44 denotes a memory usable, for example, for storing data and programs to be executed by the processor 41 and/or as a working storage of the processor 41.

The processor 41 is configured to execute processing related to the above described communication procedure. In particular, the processor 41 comprises a sub-portion 410 as a processing portion which is usable for setting up a spectrum cooperation relationship. The portion 410 may be configured to perform processing according to S600 of FIG. 9. Furthermore, the processor 41 comprises a sub-portion 411 usable as a portion for processing an indication of an established SCR (i.e. of control information related thereto). The portion 411 may be configured to perform processing according to S610 of FIG. 9. Furthermore, the processor 41 comprises a sub-portion 412 usable as a portion for conducting a communication connection path establishment. The portion 412 may be configured to perform a processing according to S620 of FIG. 9. In addition, the processor 41 comprises a sub-portion 413 usable as a portion for conducting a first type of secondary spectrum usage granting. The portion 413 may be configured to perform a processing according to S630 of FIG. 9. Moreover, the processor 41 comprises a sub-portion 414 usable as a portion for conducting a second type of secondary spectrum usage granting. The portion 414 may be configured to perform a processing according to S640 of FIG. 9.

Figure 14:
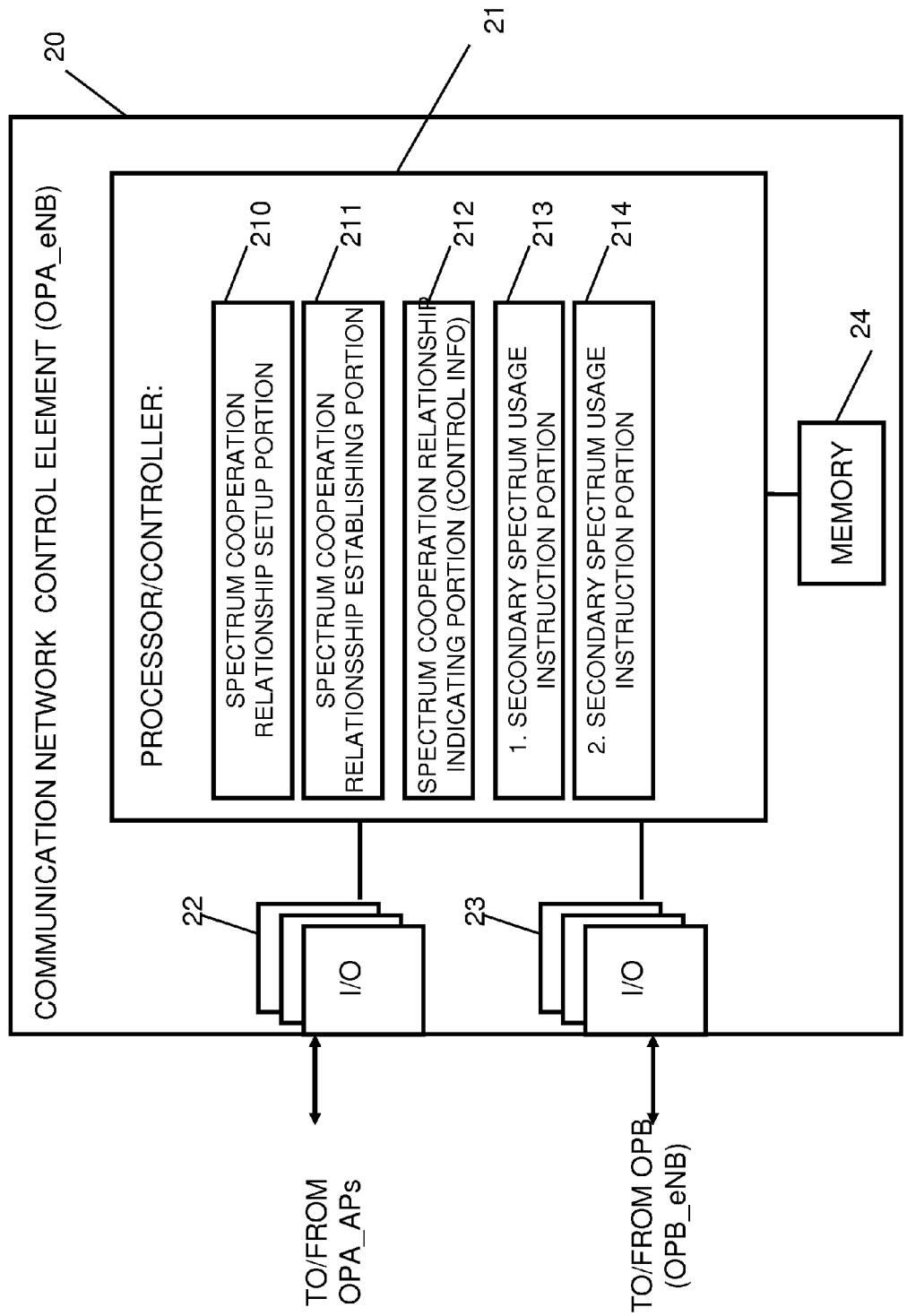
FIG. 14 shows a diagram of a communication network control element including processing portions conducting functions according to some examples of embodiments.

In FIG. 14, a diagram illustrating a configuration of a communication network control element, such as of the OPA_eNB 20, is shown, which is configured to implement the communication procedure as described in connection with some of the examples of embodiments. It is to be noted that the communication network control element like the OPA_eNB 20 shown in FIG. 14 may comprise several further elements or functions besides those described herein below. Furthermore, even though reference is made to an eNB, the communication network control element may be also another device having a similar function, such as a chipset, a chip, a module etc., which can also be part of a communication network control element or attached as a separate element to a communication network control element, or the like. It should be understood that each block and any combination thereof may be implemented by various means or their combinations, such as hardware, software, firmware, one or more processors and/or circuitry.

The communication network control element shown in FIG. 14 may comprise a processing function, control unit or processor 21, such as a CPU or the like, which are suitable for executing instructions given by programs or the like related to the communication procedure. The processor 21 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference signs 22 and 23 denote transceiver or input/output (I/O) units (interfaces) connected to the processor 21. The I/O units 22 may be used for communicating with one or more access network elements, such as OPA_APs. The I/O units 23 may be used for communicating with one or more other networks and their respective communication network control elements, like neighboring eNBs. The I/O units 22 and 23 may be a combined unit comprising communication equipment towards several network elements, or may comprise a distributed structure with a plurality of different interfaces for different network elements. Reference sign 24 denotes a memory usable, for example, for storing data and programs to be executed by the processor 21 and/or as a working storage of the processor 21.

The processor 21 is configured to execute processing related to the above described communication procedure. In particular, the processor 21 comprises a sub-portion 210 as a processing portion which is usable for setting up a spectrum cooperation relationship. The portion 210 may be configured to perform processing according to S700 of FIG. 10. Furthermore, the processor 21 comprises a sub-portion 211 usable as a portion for establishing a spectrum cooperation relationship. The portion 211 may be configured to perform processing according to S710 of FIG. 10. Furthermore, the processor 21 comprises a sub-portion 212 usable as a portion for indicating an established spectrum cooperation relationship (i.e. providing control information). The portion 212 may be configured to perform a processing according to S720 of FIG. 10. In addition, the processor 21 comprises a sub-portion 213 usable as a portion for instructing a first type of secondary spectrum usage. The portion 213 may be configured to perform a processing according to S730 of FIG. 10. Moreover, the processor 21 comprises a sub-portion 214 usable as a portion for instructing a second type of secondary spectrum usage. The portion 214 may be configured to perform a processing according to S740 of FIG. 10.

Figure 15:
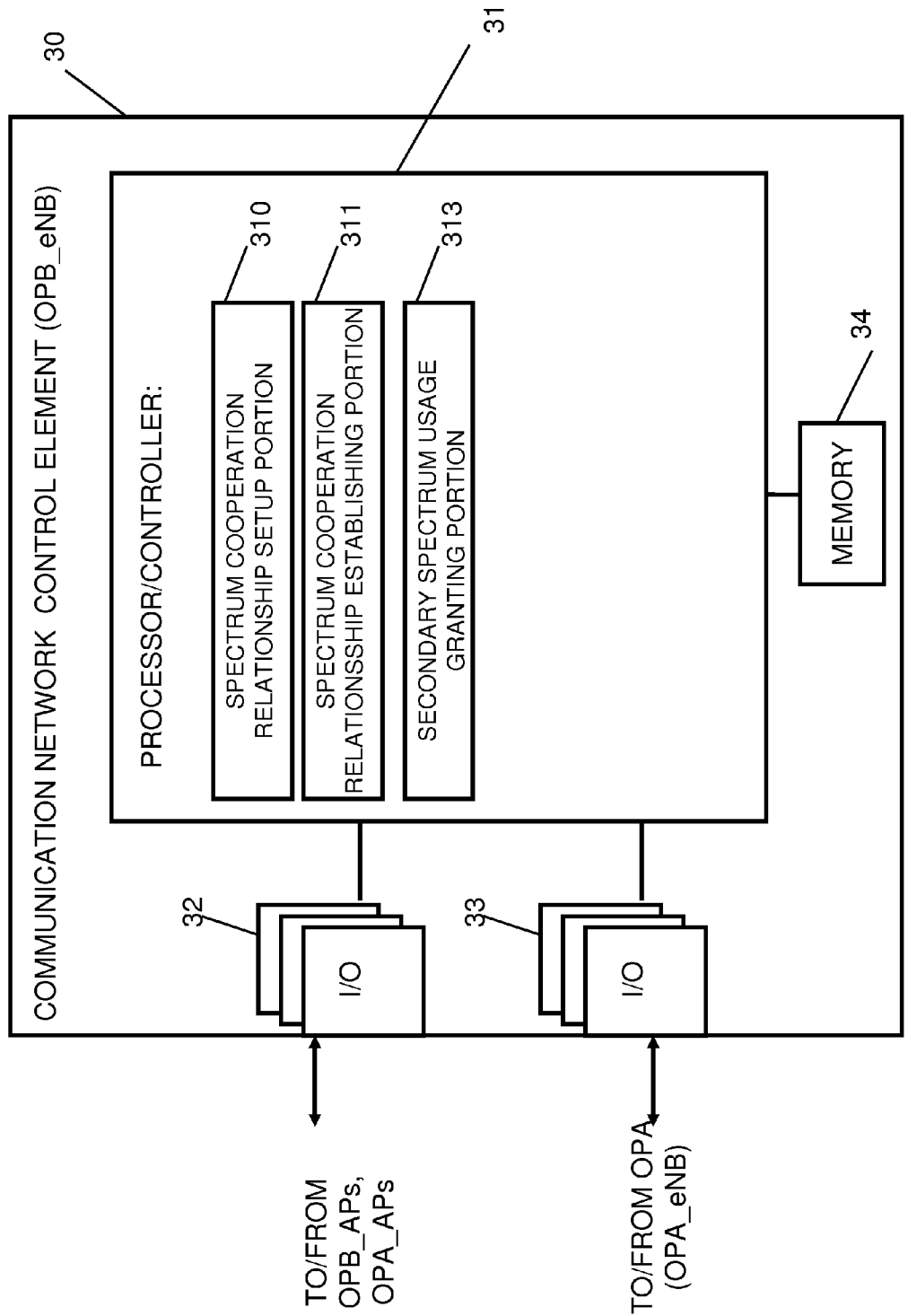
FIG. 15 shows a diagram of a communication network control element including processing portions conducting functions according to some examples of embodiments.

In FIG. 15, a diagram illustrating a configuration of a communication network control element, such as of the OPB_eNB 30, is shown, which is configured to implement the communication procedure as described in connection with some of the examples of embodiments. It is to be noted that the communication network control element like the OPB_eNB 30 shown in FIG. 15 may comprise several further elements or functions besides those described herein below. Furthermore, even though reference is made to an eNB, the communication network control element may be also another device having a similar function, such as a chipset, a chip, a module etc., which can also be part of a communication network control element or attached as a separate element to a communication network control element, or the like. It should be understood that each block and any combination thereof may be implemented by various means or their combinations, such as hardware, software, firmware, one or more processors and/or circuitry.

The communication network control element shown in FIG. 15 may comprise a processing function, control unit or processor 31, such as a CPU or the like, which are suitable for executing instructions given by programs or the like related to the communication procedure. The processor 31 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference signs 32 and 33 denote transceiver or input/output (I/O) units (interfaces) connected to the processor 31. The I/O units 32 may be used for communicating with one or more access network elements, such as OPB_APs. The I/O units 33 may be used for communicating with one or more other networks and their respective communication network control elements, like neighboring eNBs. The I/O units 32 and 33 may be a combined unit comprising communication equipment towards several network elements, or may comprise a distributed structure with a plurality of different interfaces for different network elements. Reference sign 34 denotes a memory usable, for example, for storing data and programs to be executed by the processor 31 and/or as a working storage of the processor 31.

The processor 31 is configured to execute processing related to the above described communication procedure. In particular, the processor 31 comprises a sub-portion 310 as a processing portion which is usable for setting up a spectrum cooperation relationship. The portion 310 may be configured to perform processing according to S800 of FIG. 11. Furthermore, the processor 31 comprises a sub-portion 311 usable as a portion for establishing a spectrum cooperation relationship. The portion 311 may be configured to perform processing according to S810 of FIG. 11. Furthermore, the processor 31 comprises a sub-portion 312 usable as a portion for conducting a secondary usage granting procedure. The portion 312 may be configured to perform a processing according to S830 or S840 of FIG. 11.

Figure 16:
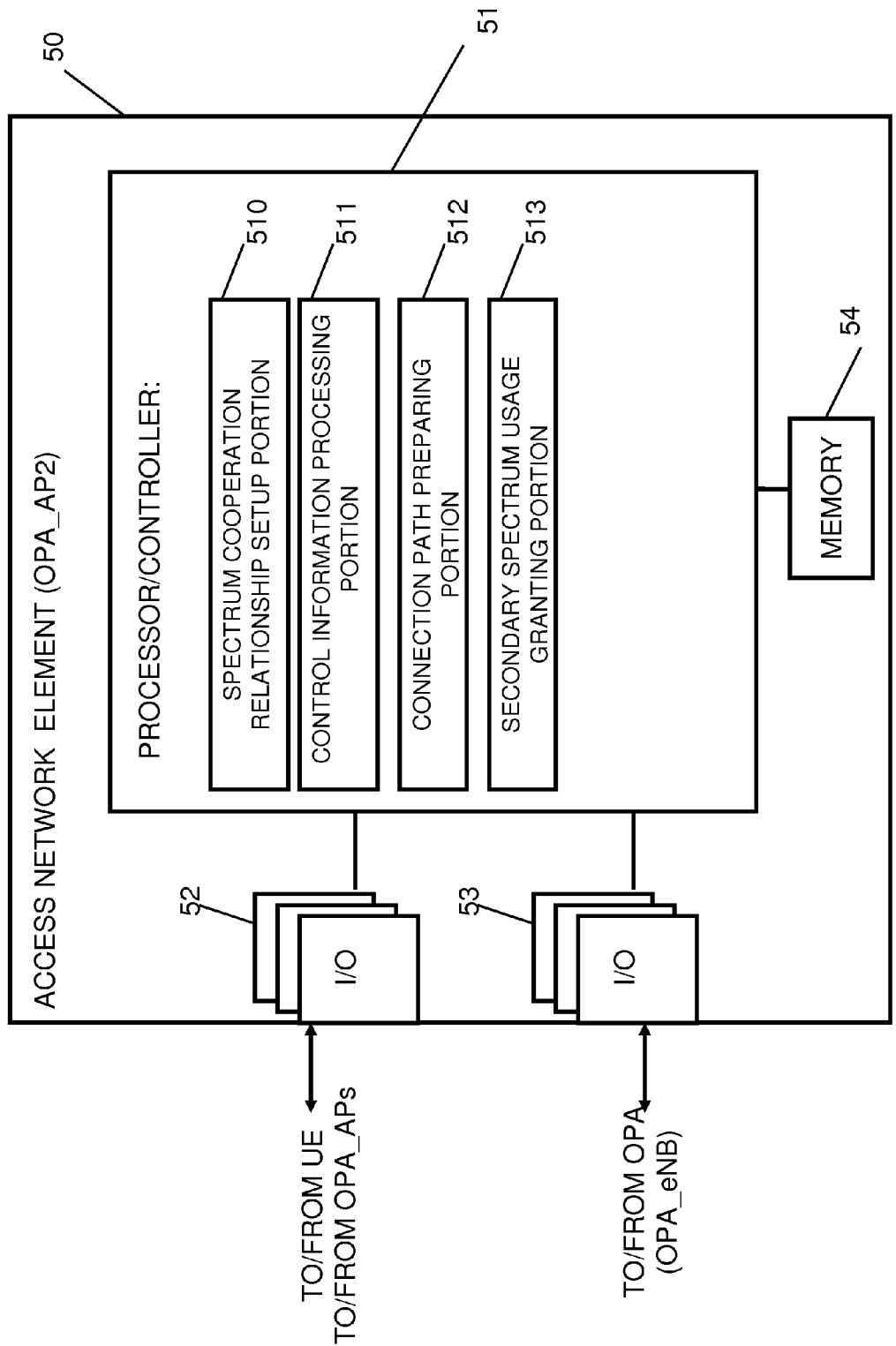
FIG. 16 shows a diagram of an access network element including processing portions conducting functions according to some examples of embodiments.

In FIG. 16, a diagram illustrating a configuration of an access network element, such as of the OPA_AP2 50 (or OPB_AP1 60), is shown, which is configured to implement the communication procedure as described in connection with some of the examples of embodiments. It is to be noted that the access network element like the OPA_AP2 50 shown in FIG. 16 may comprise further elements or functions besides those described herein below. Furthermore, even though reference is made to an AP, the access network element may be also another device having a similar function, such as a chipset, a chip, a module etc., which can also be part of an AP or attached as a separate element to an AP, or the like. It should be understood that each block and any combination thereof may be implemented by various means or their combinations, such as hardware, software, firmware, one or more processors and/or circuitry.

The access network element shown in FIG. 16 may comprise a processing function, control unit or processor 51, such as a CPU or the like, which is suitable for executing instructions given by programs or the like related to the communication procedure. The processor 51 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference signs 52 and 53 denote transceiver or input/output (I/O) units (interfaces) connected to the processor 51. The I/O units 52 may be used for communicating with one or more communication elements like UEs and with access network elements like other APs (e.g. OPA_AP1 40). The I/O units 53 may be used for communicating with an own communication network, e.g. with a controlling eNB (OPA_eNB 20), and the core network. The I/O units 52 and 53 may be a combined unit comprising communication equipment towards several network elements, or may comprise a distributed structure with a plurality of different interfaces for different network elements. Reference sign 54 denotes a memory usable, for example, for storing data and programs to be executed by the processor 51 and/or as a working storage of the processor 51.

The processor 51 is configured to execute processing related to the above described communication procedure. In particular, the processor 51 comprises a sub-portion 510 as a processing portion which is usable for setting up a spectrum cooperation relationship. The portion 510 may be configured to perform processing according to S900 of FIG. 12. Furthermore, the processor 51 comprises a sub-portion 511 usable as a portion for processing an indication of an established SCR (i.e. control information related thereto). The portion 511 may be configured to perform processing according to S910 of FIG. 12. Furthermore, the processor 51 comprises a sub-portion 512 usable as a portion for preparing a communication connection path. The portion 512 may be configured to perform a processing according to S920 of FIG. 12. In addition, the processor 51 comprises a sub-portion 513 usable as a portion for conducting a secondary spectrum usage granting. The portion 513 may be configured to perform a processing according to S930 of FIG. 12.

It is to be noted that an access network element according to some examples of embodiments may comprise components corresponding to both configurations as shown in FIGS. 13 and 16. The same applies to communication network control elements as indicated in FIGS. 14 and 15.

According to a further example of embodiments, there is provided an apparatus comprising a processor portion for conducting a processing related to set up a spectrum cooperation relationship in which a spectrum used for communication by a second communication network is allowed to be shared by at least one access network element of a first communication network, a processor portion for receiving and processing control information indicating an establishment of a spectrum cooperation relationship between the first communication network and the second communication network, and a processor portion for establishing, on the basis of the control information, a communication connection path to the second communication network wherein the at least one access network element of the first communication network acts as a communication element of the second communication network.

In addition, according to a further example of embodiments, there is provided an apparatus comprising a processor portion for controlling a processing related to set up a spectrum cooperation relationship in which a spectrum used for communication by a second communication network is allowed to be shared by at least one access network element of a first communication network, a processor portion for establishing a spectrum cooperation relationship between the first communication network and the second communication network, and a processor portion for causing transmission of control information to at least one access network element of the first communication network, the control information indicating the establishment of the spectrum cooperation relationship between the first communication network and the second communication network.

In addition, according to a further example of embodiments, there is provided an apparatus comprising a processor portion for controlling a processing related to set up a spectrum cooperation relationship in which a spectrum used for communication by a second communication network being the own communication network is allowed to be shared by at least one access network element of a first communication network being another communication network, a processor portion for establishing a spectrum cooperation relationship between the first communication network and the second communication network, and a processor portion for establishing a communication connection path to at least one access network element of the first communication network wherein the at least one access network element of the first communication network acts as a communication element of the second communication network.

Furthermore, according to a further example of embodiments, there is provided an apparatus comprising a processor portion for conducting a processing related to set up a spectrum cooperation relationship in which a spectrum used for communication by a second communication network is allowed to be shared by at least one access network element of a first communication network, a processor portion for receiving and processing control information indicating an existence of an established spectrum cooperation relationship between the first communication network and the second communication network, and a processor portion for preparing, on the basis of the control information, a communication connection path for requesting a secondary spectrum usage.

In addition, when referring to a scenario as indicated, for example in connection with FIG. 4 to FIG. 7, there may be provided an apparatus acting as the communication network control element and comprising at least one processor, and at least one memory for storing instructions to be executed by the processor, wherein the at least one memory and the instructions are configured to, with the at least one processor, cause the apparatus at least: to control a processing related to set up a spectrum cooperation relationship in which a spectrum used for communication by a second communication network is allowed to be shared by at least one access network element of a first communication network, to determine that a spectrum cooperation relationship has been already established between the first communication network and the second communication network, and to cause transmission of control information to at least one access network element of the first communication network, the control information indicating the existence of an establishment of a spectrum cooperation relationship between the first communication network and the second communication network. It is to be noted that this functionality, in particular the determination that a spectrum cooperation relationship exists between the first network (e.g. OPA) and the second network (e.g. OPB) may be executed by both sides, i.e. for example, the OPA_eNB 20 and the OPB_eNB30, wherein on both cases the SCR is established for OPA_AP1 40 (i.e. the existence of an established SCR for a small cell can be determined in case the small cell is of the same network as the communication network control element or of a different network).

It should be appreciated that
    an access technology via which signaling is transferred to and from a network element may be any suitable present or future technology, such as WLAN (Wireless Local Access Network), WiMAX (Worldwide Interoperability for Microwave Access), LTE, LTE-A, Bluetooth, Infrared, and the like may be used; Additionally, embodiments may also apply wired technologies, e.g. IP based access technologies like cable networks or fixed lines. —a user device (also called UE, user equipment, user terminal, terminal device, etc.) illustrates one type of an apparatus to which resources on the air interface may be allocated and assigned, and thus any feature described herein with a user device may be implemented with a corresponding apparatus, such as a relay node. An example of such a relay node is a layer 3 relay (self-backhauling relay) towards the base station or eNB. The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. It should be appreciated that a device may be regarded as an apparatus or as an assembly of more than one apparatus, whether functionally in cooperation with each other or functionally independently of each other but in a same device housing.

embodiments suitable to be implemented as software code or portions of it and being run using a processor are software code independent and can be specified using any known or future developed programming language, such as a high-level programming language, such as objective-C, C, C++, C#, Java, etc., or a low-level programming language, such as a machine language, or an assembler,—implementation of embodiments, is hardware independent and may be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), and/or TTL (Transistor-Transistor Logic).

embodiments may be implemented as individual devices, apparatuses, units or means or in a distributed fashion, for example, one or more processors may be used or shared in the processing, or one or more processing sections or processing portions may be used and shared in the processing, wherein one physical processor or more than one physical processor may be used for implementing one or more processing portions dedicated to specific processing as described, an apparatus may be implemented by a semiconductor chip, a chipset, or a (hardware) module comprising such chip or chipset;

embodiments may also be implemented as any combination of hardware and software, such as ASIC (Application Specific IC (Integrated Circuit)) components, FPGA (Field-programmable Gate Arrays) or CPLD (Complex Programmable Logic Device) components or DSP (Digital Signal Processor) components.

embodiments may also be implemented as computer program products, comprising a computer usable medium having a computer readable program code embodied therein, the computer readable program code adapted to execute a process as described in embodiments, wherein the computer usable medium may be a non-transitory medium. Computer program products, also called programs or computer programs, including software routines, applets and macros, may be stored in any apparatus-readable data storage medium and they comprise program instructions to perform one or more particular tasks. A computer program product may comprise one or more computer-executable components which, when the program is run, are configured to carry out embodiments. The one or more computer-executable components may be at least one software code or portions of it.

Although the present invention has been described herein before with reference to particular embodiments thereof, the present invention is not limited thereto and various modifications can be made thereto.

The invention claim is:

1. An apparatus comprising: at least one processor; and at least one memory for storing instructions to be executed by the processor, wherein the at least one memory and the instructions are configured to, with the at least one processor, cause the apparatus to at least:

conduct a procedure associated with setting up a spectrum cooperation relationship, in which a spectrum used for communication by a second communication network is allowed to be shared by at least one access network element of a first communication network; receive and process control information indicating an establishment of a spectrum cooperation relationship between the first communication network and the second communication network; establish, on the basis of the control information, a communication connection path to the second communication network, wherein the at least one access network element of the first communication network acts as a communication element of the second communication network; request a grant of a secondary spectrum usage based on the established spectrum cooperation relationship from the second communication network by causing a transmission of a grant request message via the established communication connection path; and receive and process a response to the grant request message from the second communication network, wherein the response is information associated with a spectrum of the second communication network granted for the secondary spectrum usage and information related to usage conditions.

2. The apparatus according to claim 1, wherein the causing the apparatus to conduct a procedure associated with setting up the spectrum cooperation relationship further comprises causing the apparatus to:

detect communications of cells belonging to the second communication network, and report results of the detection of communications of the cells to the first communication network.

3. The apparatus according to claim 2, wherein the detection of communications of cells belonging to the second communication network is initiated by at least one of:

a request form the first communication network, and pre-configured information providing information about the communications of the cells belonging to the second communication network.

4. The apparatus according to claim 1, wherein the control information comprises at least one of:

information indicating a cell of the second communication network to be used as a serving cell, and context information related to the establishment of a communication connection by a communication element of the second network.

5. The apparatus according to claim 1, wherein the causing the apparatus to establish a communication connection path to the second communication network comprises causing the apparatus to:
conduct an access procedure via an access channel to the second network in accordance with an access procedure used by a communication element.

6. The apparatus according to claim 1, wherein the request for the grant of the secondary spectrum usage is triggered by one of: a command received from the first communication network, and an internal trigger processing based on conditions and rules related a request for a grant of a secondary spectrum usage.

7. The apparatus according to claim 1, wherein the at least one memory and the instructions are further configured to, with the at least one processor, cause the apparatus to at least: determine whether a communication with the second communication network is possible when serving a connected communication element, and when the determination is negative, interrupt a communication operation with the connected communication element, and instruct the connected communication element to communicate with the second communication network for transmitting the grant request message.

8. The apparatus according to claim 1, wherein the at least one memory and the instructions are further configured to, with the at least one processor, cause the apparatus at least to: receive and process an update message indicating an update of information including the response to the grant request message.

9. The apparatus according to claim 1, wherein the at least one memory and the instructions are further configured to, with the at least one processor, cause the apparatus at least:
receive and process a request for a grant of a secondary spectrum usage based on the established spectrum cooperation relationship for another access network element, and
transmit a grant response message for the request for the grant of the secondary spectrum usage for the other access network element.

10. The apparatus according to claim 9, wherein the processing of the request for the grant of the secondary spectrum usage for the other access network element includes:
determine whether the request is to be forwarded to the first or second communication network for granting of the secondary spectrum usage for the other access network element,
wherein in the case that the determination is negative, the processing includes:
coordinate a usage of a previously granted secondary spectrum usage with the other access network element, and
prepare the grant response message for the request for the grant of the secondary spectrum usage for the other access network element on the basis of the coordination,
wherein in the case that the determination is positive, the processing includes:
transmit the request to the first or second communication network, wherein an indication of the other access network element is included to the request,
receive a grant response message from the first or second communication network, and
prepare the grant response message for the request for the grant of the secondary spectrum usage for the other access network element on the basis of the received grant response message from the first or second communication network.

11. The apparatus according to claim 1, further comprising an access network element of a cell of the first communication network,
wherein the first communication network is controlled by a first communication network control element or a first operation and maintenance element, and the second communication network is controlled by a second communication network control element or a second operation and maintenance element.

12. An apparatus comprising: at least one processor; and at least one memory for storing instructions to be executed by the processor, wherein the at least one memory and the instructions are configured to, with the at least one processor, cause the apparatus to at least: control a procedure associated with setting up a spectrum cooperation relationship, in which a spectrum used for communication by a second communication network is allowed to be shared by at least one access network element of a first communication network; establish a spectrum cooperation relationship between the first communication network and the second communication network; transmit control information to at least one access network element of the first communication network, the control information indicating the establishment of the spectrum cooperation relationship between the first communication network and the second communication network; request a grant of a secondary spectrum usage based on the established spectrum cooperation relationship from the second communication network, wherein the request grant of the secondary spectrum usage is triggered by a command received from the first communication network; and receive and process a response to a grant request message from the second communication network, wherein the response is information associated with a spectrum of the second communication network granted for the secondary spectrum usage and information related to usage conditions.

13. The apparatus according to claim 12, wherein the at least one memory and the instructions are further configured to, with the at least one processor, cause the apparatus to at least:
request the at least one access network element to detect the communications of cells belonging to the second communication network.

14. The apparatus according to claim 12, wherein the procedure associated with setting up the spectrum cooperation relationship further comprises:
receive and process a report indicating a detection of communications of cells belonging to the second communication network.

15. The apparatus according to claim 12, wherein the at least one memory and the instructions are further configured to, with the at least one processor, cause the apparatus to at least:
transmit information about the communications of the cells belonging to the second communication network for pre-configuring a detection of communications of cells belonging to the second communication network.

16. An apparatus comprising: at least one processor; and at least one memory for storing instructions to be executed by the processor, wherein the at least one memory and the instructions are configured to, with the at least one processor, cause the apparatus to at least: control a procedure associated with setting up a spectrum cooperation relationship, in which a spectrum used for communication by a second communication network being the own communication network is allowed to be shared by at least one access network element of a first communication network being another communication network; establish a spectrum cooperation relationship between the first communication network and the second communication network; establish a communication connection path to at least one access network element of the first communication network, wherein the at least one access network element of the first communication network acts as a communication element of the second communication network; receive and process a grant request message requesting a grant of a secondary spectrum usage based on the established spectrum cooperation relationship, wherein the grant request message is received via the established communication connection path; and receive and process a response to the grant request message from the second communication network, wherein the response is information associated with a spectrum of the second communication network granted for a secondary spectrum usage and information related to usage conditions.

17. The apparatus according to claim 16, wherein the causing the apparatus to establish a communication connection path to the at least one access network element of the first communication network comprises causing the apparatus to:
conduct an access procedure via an access channel of the second network in accordance with an access procedure used by a communication element.

18. The apparatus according to claim 16, wherein the establishment of the spectrum cooperation relationship between the first communication network and the second communication network includes:
receive and process a spectrum cooperation relationship establishment request, and
transmit a response to the spectrum cooperation relationship establishment request,
wherein the spectrum cooperation relationship establishment request includes at least one of:
an identification of cells of the second communication network usable as serving cells for establishing a communication connection path with the at least one access network element, and
an identification of the at least one access network element and information related to a capability of the at least one access network element for acting as a communication element.

19. The apparatus according to claim 18, wherein the processing of the spectrum cooperation relationship establishment request includes:
determine a cell to be used as a serving cell for a request for grant of a secondary spectrum usage, and
determine context information related to an establishment of a communication connection by a communication element,
wherein the response to the spectrum cooperation relationship establishment request includes at least one of:
information indicating the cell of the second communication network to be used as the serving cell, and
the context information related to the establishment of a communication connection by a communication element.

20. The apparatus according to claim 16, wherein the at least one memory and the instructions are further configured to, with the at least one processor, cause the apparatus at least to:

transmit a response to the grant request message via the established communication connection path, the response comprising information related to a spectrum of the second communication network granted for a secondary spectrum usage and information related to usage conditions.

21. The apparatus according to claim 20, wherein the at least one memory and the instructions are further configured to, with the at least one processor, cause the apparatus at least to:
initiate a measurement of interferences in the second communication network caused by communications of the at least one access network element of the first communication network using the spectrum of the second communication network granted for a secondary spectrum usage,
to process a result of the measurements of interferences, to decide on the basis of the results of measurements whether an update of grant of the secondary spectrum usage is necessary, and
to cause a transmission of update information for modifying the information comprised in the response to the grant request message via the established communication connection path, the update information being related to a modified spectrum of the second communication network granted for a secondary spectrum usage and information related to modified usage conditions.

22. The apparatus according to claim 21, wherein the initiation of a measurement of interferences includes:
request at least one access network element or a communication network control element of the second communication network to conduct the measurement of interferences based on an indication of the at least one access network element of the first communication network using the spectrum of the second communication network granted for a secondary spectrum usage, and
receive and process results of the measurements conducted by the at least one access network element of the second communication network.

23. The apparatus according to claim 16, further comprising at least one of a communication network control element, and an operation and maintenance element of the second communication network,
wherein the first communication network is controlled by a first communication network control element or a first operation and maintenance element.

24. A method comprising: conducting a procedure associated with setting up a spectrum cooperation relationship, in which a spectrum used for communication by a second communication network is allowed to be shared by at least one access network element of a first communication network; receiving control information indicating an establishment of a spectrum cooperation relationship between the first communication network and the second communication network, processing the control information; establishing, on the basis of the control information, a communication connection path to the second communication network, wherein the at least one access network element of the first communication network acts as a communication element of the second communication network; requesting a grant of a secondary spectrum usage based on the established spectrum cooperation relationship from the second communication network by causing a transmission of a grant request message via the established communication connection path; and receiving and processing a response to a grant request message from the second communication network, wherein the response is information associated with a spectrum of the second communication network granted for the secondary spectrum usage and information related to usage conditions.

25. A method comprising: controlling a procedure associated with setting up a spectrum cooperation relationship in which a spectrum used for communication by a second communication network is allowed to be shared by at least one access network element of a first communication network; establishing a spectrum cooperation relationship between the first communication network and the second communication network; causing transmission of control information to at least one access network element of the first communication network, the control information indicating the establishment of the spectrum cooperation relationship between the first communication network and the second communication network; requesting a grant of a secondary spectrum usage based on the established spectrum cooperation relationship; and receiving and processing a response to a grant request message from the second communication network, wherein the response is information associated with a spectrum of the second communication network granted for the secondary spectrum usage and information related to usage conditions.

26. A method comprising: controlling a procedure associated with setting up a spectrum cooperation relationship in which a spectrum used for communication by a second communication network being the own communication network is allowed to be shared by at least one access network element of a first communication network being another communication network; establishing a spectrum cooperation relationship between the first communication network and the second communication network; establishing a communication connection path to at least one access network element of the first communication network wherein the at least one access network element of the first communication network acts as a communication element of the second communication network; receiving and processing a grant request message requesting a grant of a secondary spectrum usage based on of the established spectrum cooperation relationship, wherein the grant request message is received via the established communication connection path; and receiving and processing a response to the grant request message from the second communication network, wherein the response is information associated with a spectrum of the second communication network granted for a secondary spectrum usage and information related to usage conditions.

27. The method according to claim 26, wherein the establishing a communication connection path to the at least one access network element of the first communication network includes:
conducting an access procedure via an access channel of the second network in accordance with an access procedure used by a communication element.

* * * * *